United States Patent
Seo et al.

(10) Patent No.: US 9,924,478 B2
(45) Date of Patent: Mar. 20, 2018

(54) METHOD FOR TRANSMITTING SYNC SIGNALS FOR DEVICE-TO-DEVICE (D2D) COMMUNICATION IN WIRELESS COMMUNICATION SYSTEM AND APPARATUS THEREFOR

(71) Applicant: LG ELECTRONICS INC., Seoul (KR)

(72) Inventors: Daewon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 14/912,850

(22) PCT Filed: Sep. 1, 2014

(86) PCT No.: PCT/KR2014/008136
§ 371 (c)(1),
(2) Date: Feb. 18, 2016

(87) PCT Pub. No.: WO2015/030548
PCT Pub. Date: Mar. 5, 2015

(65) Prior Publication Data
US 2016/0205644 A1  Jul. 14, 2016

Related U.S. Application Data

(60) Provisional application No. 61/872,756, filed on Sep. 1, 2015, provisional application No. 61/896,670, filed
(Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04L 5/0053* (2013.01);
(Continued)

(58) Field of Classification Search
CPC .... H04W 4/005–4/008; H04W 76/02–76/028; H04W 8/005
See application file for complete search history.

(56) References Cited

U.S. PATENT DOCUMENTS

2012/0320776 A1  12/2012  Lim et al.
2014/0064263 A1*  3/2014  Cheng ................ H04W 8/005
370/350
(Continued)

FOREIGN PATENT DOCUMENTS

KR  10-2012-0073147 A  7/2012
KR  10-2012-0140000 A  12/2012
(Continued)

*Primary Examiner* — Marcus R Smith
(74) *Attorney, Agent, or Firm* — Birch, Stewart, Kolasch & Birch, LLP

(57) ABSTRACT

The present invention relates to a method and apparatus for transmitting a Device-to-Device Synchronization Signal (D2DSS) for D2D communication by a terminal in a wireless communication system and, more particularly, comprises a step of transmitting a D2DSS, wherein first root indexes associated with the D2DSS are set to be different from second root indexes associated with sync signals for a cellular communication, and the number of the first root indexes is less than the number of the second root indexes.

12 Claims, 25 Drawing Sheets

(a)

(b)

Related U.S. Application Data on Oct. 29, 2013, provisional application No. 61/910,030, filed on Nov. 27, 2013, provisional application No. 61/912,500, filed on Dec. 5, 2013, provisional application No. 61/932,762, filed on Jan. 28, 2014, provisional application No. 61/972,939, filed on Mar. 30, 2014.

(51) Int. Cl.
    *H04L 27/26*     (2006.01)
    *H04W 8/00*     (2009.01)
    *H04W 76/02*     (2009.01)

(52) U.S. Cl.
    CPC ...... *H04L 27/2613* (2013.01); *H04L 27/2692* (2013.01); *H04W 56/00* (2013.01); *H04W 8/005* (2013.01); *H04W 76/023* (2013.01)

(56) References Cited

U.S. PATENT DOCUMENTS

| | | | |
|---|---|---|---|
| 2014/0198772 A1* | 7/2014 | Baldemair | H04L 27/2655 370/335 |
| 2014/0323126 A1* | 10/2014 | Ro | H04W 8/005 455/434 |
| 2014/0328329 A1* | 11/2014 | Novlan | H04W 72/042 370/336 |
| 2015/0055616 A1 | 2/2015 | Kim et al. | |
| 2015/0304149 A1 | 10/2015 | Kim et al. | |
| 2016/0050702 A1* | 2/2016 | Sorrentino | H04W 56/0025 370/329 |
| 2016/0192309 A1* | 6/2016 | Kim | H04W 56/0015 370/350 |

FOREIGN PATENT DOCUMENTS

| | | |
|---|---|---|
| KR | 10-2013-0082062 A | 7/2013 |
| WO | WO 2013/125887 A1 | 8/2013 |
| WO | WO 2013/125925 A1 | 8/2013 |

\* cited by examiner

FIG. 2
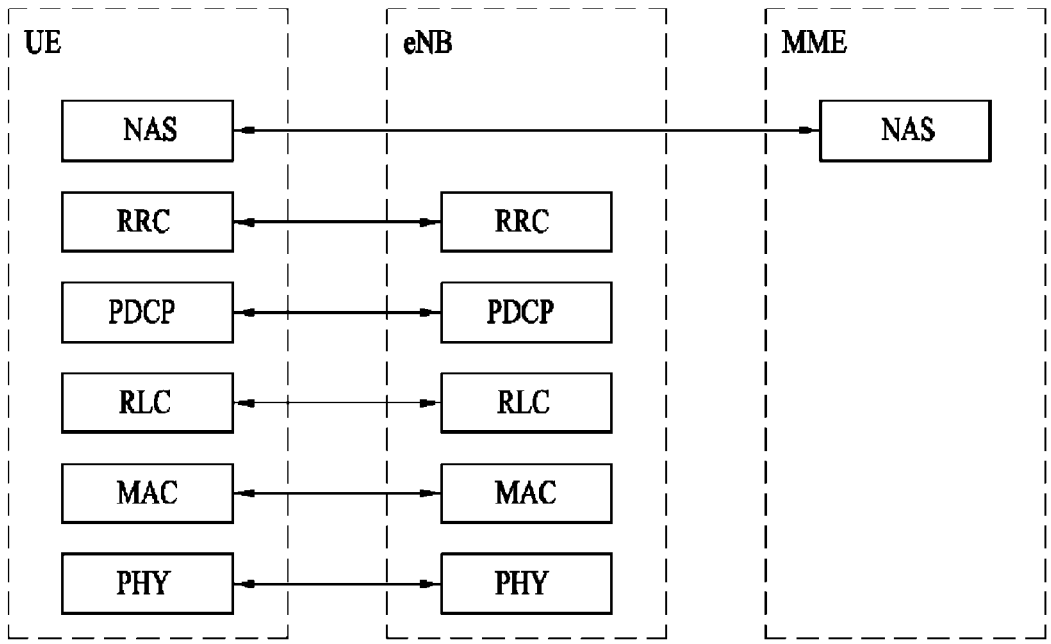
(a) Control-plane protocol stack
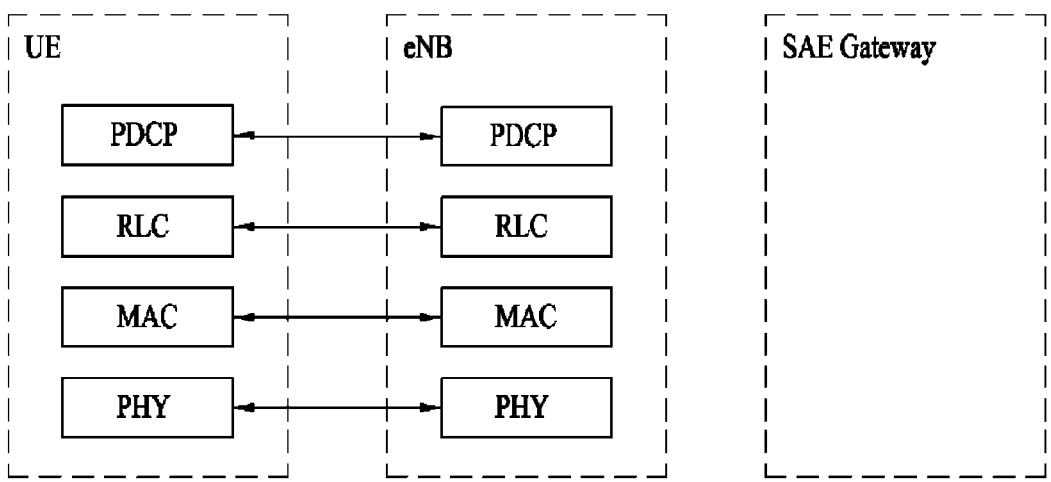
(b) User-plane protocol stack FIG. 19
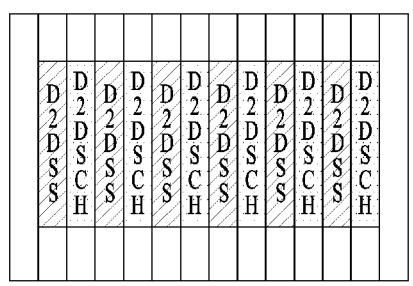
(a)
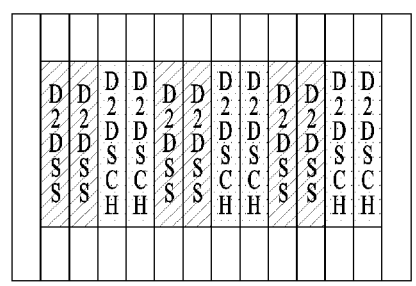
(b)
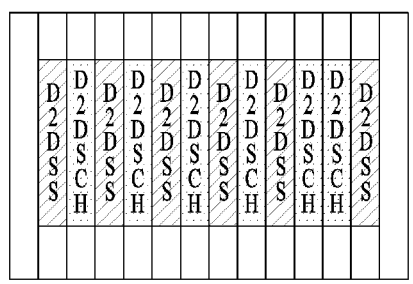
(c)
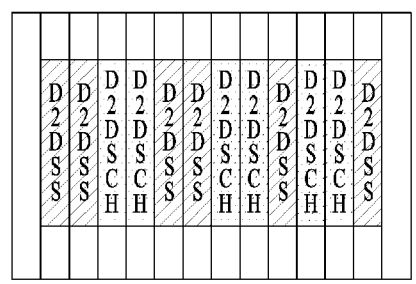
(d)
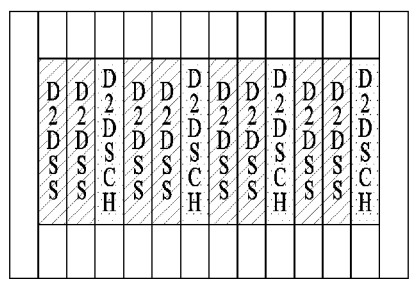
(e)
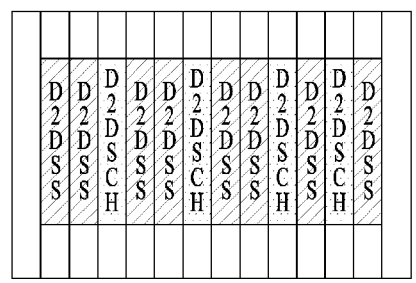
(f)

(a)  (b)

(a) [empty, sym1, sym2]  (b) [CP1, sym1, sym2, CP2]

(a) same time, diff freq resource (b) diff time, freq resource (a) CH-Relay SFN                (b) Relay only SFN (a)                (b)

FIG. 28

| Gr0 | Gr0 | Gr1 | Gr1 | Gr2 | Gr2 | Gr0 | Gr0 | Gr1 | Gr1 | Gr2 | Gr2 |

(a)

| Gr0 | Gr1 | Gr2 | Gr0 | Gr1 | Gr2 | Gr0 | Gr0 | Gr1 | Gr1 | Gr2 | Gr2 |

(b)

| Gr0 | Gr1 | Gr2 | Gr0 | Gr0 | Gr0 | Gr1 | Gr1 | Gr1 | Gr2 | Gr2 | Gr2 |

(c)

| Gr0 | Gr0 | Gr1 | Gr1 | Gr2 | Gr2 | Gr0 | Gr1 | Gr2 | Gr0 | Gr1 | Gr2 |

(b)

METHOD FOR TRANSMITTING SYNC SIGNALS FOR DEVICE-TO-DEVICE (D2D) COMMUNICATION IN WIRELESS COMMUNICATION SYSTEM AND APPARATUS THEREFOR

CROSS REFERENCE TO RELATED APPLICATIONS

This application is the National Phase of PCT/KR2014/008136 filed on Sep. 1, 2014, which claims priority under 35 U.S.C. § 119(e) to U.S. Provisional Application Nos. 61/872,756 filed on Sep. 1, 2013; 61/896,670 filed on Oct. 29, 2013; 61/910,030 filed on Nov. 27, 2013; 61/912,500 filed on Dec. 5, 2013; 61/932,762 filed on Jan. 28, 2014; and 61/972,393 filed on Mar. 30, 2014, all of which are hereby expressly incorporated by reference into the present application.

TECHNICAL FIELD

The present invention relates to a wireless communication system, and more particularly, to a method of detecting a synchronization signal for a D2D (DEVICE-TO-DEVICE) communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARD). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

The technical task of the present invention is to provide a method of transmitting a synchronization signal for a D2D (DEVICE-TO-DEVICE) communication in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these objects and other advantages and in accordance with the purpose of the invention, as embodied and broadly described herein, in transmitting a D2D (Device-to-Device) synchronization signal (D2DSS) for a D2D (Device-to-Device) communication by a user equipment in a wireless communication system, a method of transmitting a synchronization signal according to one embodiment of the present invention may include the step of transmitting the synchronization signal for the D2D communication, wherein a $1^{st}$ root index associated with the synchronization signal for the D2D communication is set different from a $2^{nd}$ root index associated with a synchronization signal for a cellular communication and wherein the number of the $1^{st}$ root indexes is smaller than that of the $2^{nd}$ root indexes.

Preferably, based on a sequence for the synchronization signal for the cellular communication, a sequence for the synchronization signal for the D2D communication may be generated through at least one of a change of a sequence length, a change of a sequence identity (ID), a change of a cyclic shift, a change of a repetition count, a change of a transmission location, and a change of transmission periodicity.

Preferably, the synchronization signal for the D2D communication may include a $1^{st}$ synchronization signal and a $2^{nd}$ synchronization signal and each of the 1st synchronization signal and the $2^{nd}$ synchronization signal may be configured to be located on contiguous symbols.

Preferably, the synchronization signal for the D2D communication may include a $1^{st}$ synchronization signal and a $2^{nd}$ synchronization signal and the 1st synchronization signal and the $2^{nd}$ synchronization signal may be configured to be located alternately. Preferably, the $1^{st}$ synchronization signal and the $2^{nd}$ synchronization signal may be assigned to a prescribed number of contiguous symbols in a single subframe.

Preferably, the synchronization signal for the D2D communication may include a $1^{st}$ synchronization signal, a $2^{nd}$ synchronization signal and a D2D synchronization channel (D2DSCH) (i.e., a synchronization channel for the D2D communication) and the D2D synchronization channel may be configured to be located between the 1st synchronization signal and the $2^{nd}$ synchronization signal. More preferably, a symbol corresponding to one selected from the $1^{st}$ synchronization signal, the $2^{nd}$ synchronization signal and the D2D synchronization channel (D2DSCH) may be configured to have DMRS (demodulation reference signal) reassigned.

Preferably, the synchronization signal for the D2D communication may include a $1^{st}$ synchronization signal and a $2^{nd}$ synchronization signal and the $2^{nd}$ synchronization signal may be configured to be used for a frequency error detection.

Preferably, the synchronization signal for the D2D communication may be assigned to a multitude of contiguous symbols and monitored by a receiving end for 1 symbol duration at a specific location among a plurality of the contiguous symbols.

Preferably, the synchronization signal for the D2D communication may include a $1^{st}$ synchronization signal and a $2^{nd}$ synchronization signal and the 1st synchronization signal and the $2^{nd}$ synchronization signal may be configured to differ from each other in periodicity. More preferably, if a reception timing point of the 1st synchronization signal is equal to that of the $2^{nd}$ synchronization signal, the $1^{st}$ synchronization signal including a D2D synchronization channel (D2DSCH) (i.e., synchronization channel for the D2D communication may be monitored by a receiving end. More preferably, if a reception timing point of the $1^{st}$ synchronization signal is equal to that of the $2^{nd}$ synchronization signal, a long-periodicity synchronization signal selected from the $1^{st}$ synchronization signal and the $2^{nd}$ synchronization signal may be monitored.

Preferably, the synchronization signal for the D2D communication may be configured to have a frequency domain different from that of a D2D synchronization signal of a cluster head on a same time domain.

Preferably, the synchronization signal for the D2D communication may include a multitude of groups, each of the groups may include a multitude of symbols having a same phase change, and physical mapping locations of a multitude of the groups may be determined according to frequency obtaining scale.

In another aspect of the present invention, as embodied and broadly described herein, in transmitting a D2D (Device-to-Device) synchronization signal (D2DSS) for a D2D (Device-to-Device) communication in a wireless communication system, a user equipment according to another embodiment of the present invention may include a radio frequency unit and a processor configured to transmit the synchronization signal for the D2D communication, wherein a $1^{st}$ root index associated with the synchronization signal for the D2D communication is set different from a $2^{nd}$ root index associated with a synchronization signal for a cellular communication and wherein the number of the $1^{st}$ root indexes is smaller than that of the $2^{nd}$ root indexes.

Advantageous Effects

According to the present invention, a synchronization signal transmission for a D2D communication can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram of structures of control and user planes of a radio interface protocol between a user equipment and E-UTRAN based on 3GPP radio access network specification.

FIG. 19 is a reference diagram to describe a case of disposing a synchronization signal and a synchronization channel.

FIG. 28 is a reference diagram to describe various embodiments of disposing groups on various symbols according to the present invention.

BEST MODE FOR INVENTION

Figure 1:
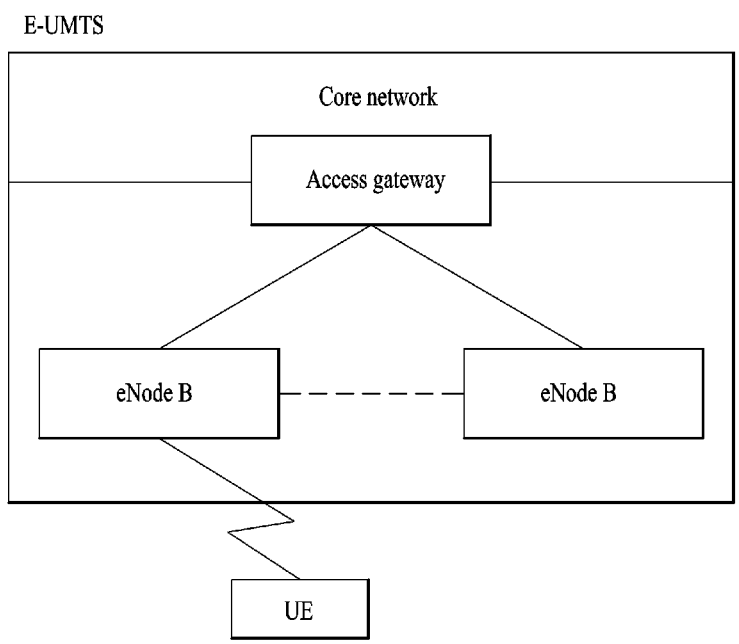
FIG. 1 shows a structure of E-UMTS network as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
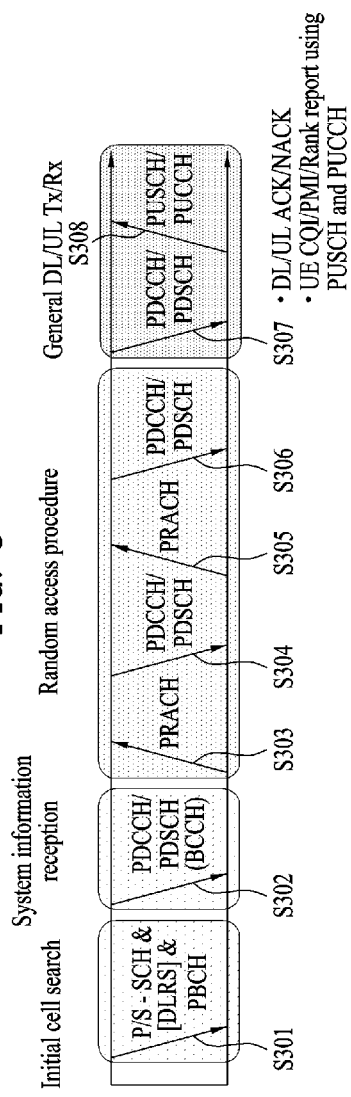
FIG. 3 is a diagram for explaining physical channels used for 3GPP system and a general method of transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
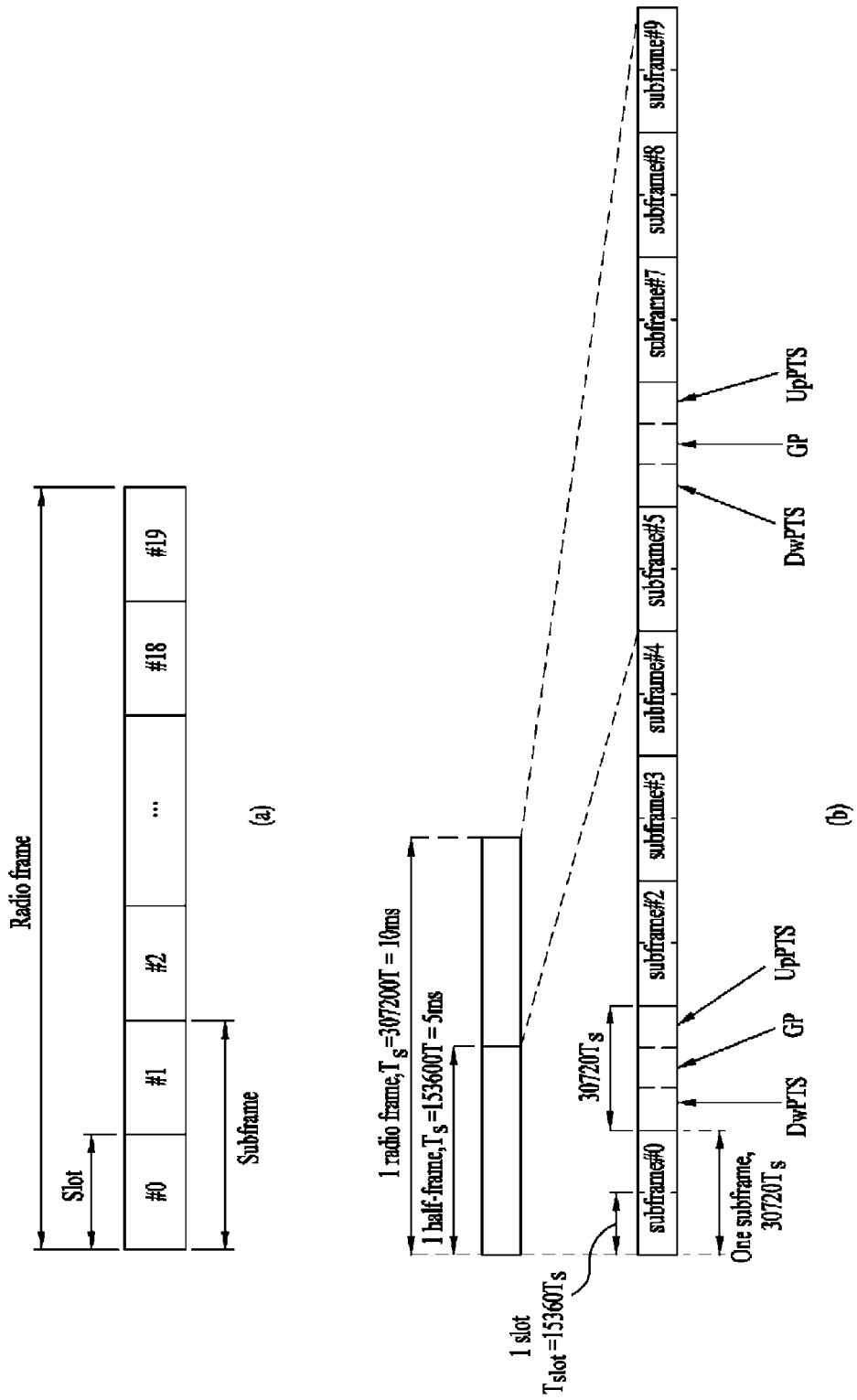
FIG. 4 is a diagram for a structure of a radio subframe used by LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
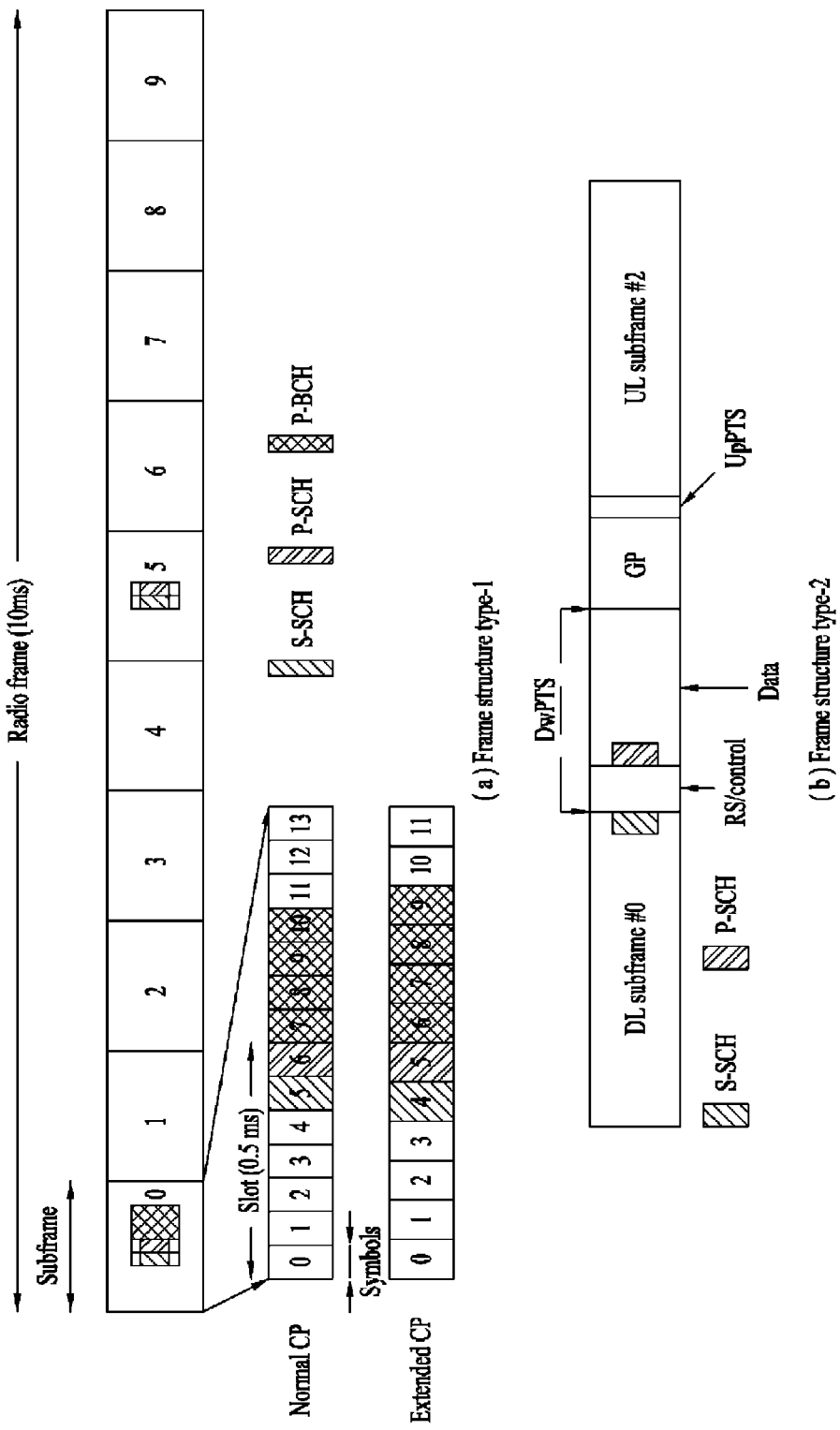
FIG. 5 is a diagram of P=BCH (primary broadcast channel) and SCH (synchronization channel) of LTE system.

FIG. 5 is a diagram of P=BCH (primary broadcast channel) and SCH (synchronization channel) of LTE system. SCH includes P-SCH and S-SCH. PSS (primary synchronization signal) is carried on P-SCH and SSS (secondary synchronization signal) is carried on S-SCH.

Referring to FIG. 5, in a frame structure type-1 (i.e., FDD), P-SCH is located at a last OFDM symbol of each of slot #0 (i.e., 1$^{st}$ slot of subframe #0) and slot #10 (i.e., 1$^{st}$ slot of subframe #5) in each radio frame. S-SCH is located at an OFDM symbol right previous to a last OFDM symbol of each of the slot #0 and the slot #10 in each radio frame. S-SCH and P-SCH are located at OFDM symbols adjacent to each other, respectively. In a frame structure type-2 (i.e., TDD), P-SCH is transmitted through 3$^{rd}$ OFDM symbol of subframe #1/#6 and S-SCH is located at a last OFDM symbol of each of slot #1 (i.e., 2$^{nd}$ slot of subframe #0) and slot #11 (i.e., 2$^{nd}$ slot of subframe #5). P-BCH is transmitted in each 4 radio frames irrespective of the frame structure types and is transmitted using 1$^{st}$ to 4$^{th}$ OFDM symbols of the 2$^{nd}$ slot of the subframe #0.

P-SCH is transmitted using 72 subcarriers (i.e., transmitting PSS on 62 subcarriers by reserving 10 subcarriers) centering on DC (direct current) subcarrier in a corresponding OFDM symbol. S-SCH is transmitted using 72 subcarriers (i.e., transmitting SSS on 62 subcarriers by reserving 10 subcarriers) centering on DC (direct current) subcarrier in a corresponding OFDM symbol. P-BCH is mapped to 4 OFDM symbols and 72 subcarriers centering on DC (direct current) subcarrier in 1 subframe.

Figure 6:
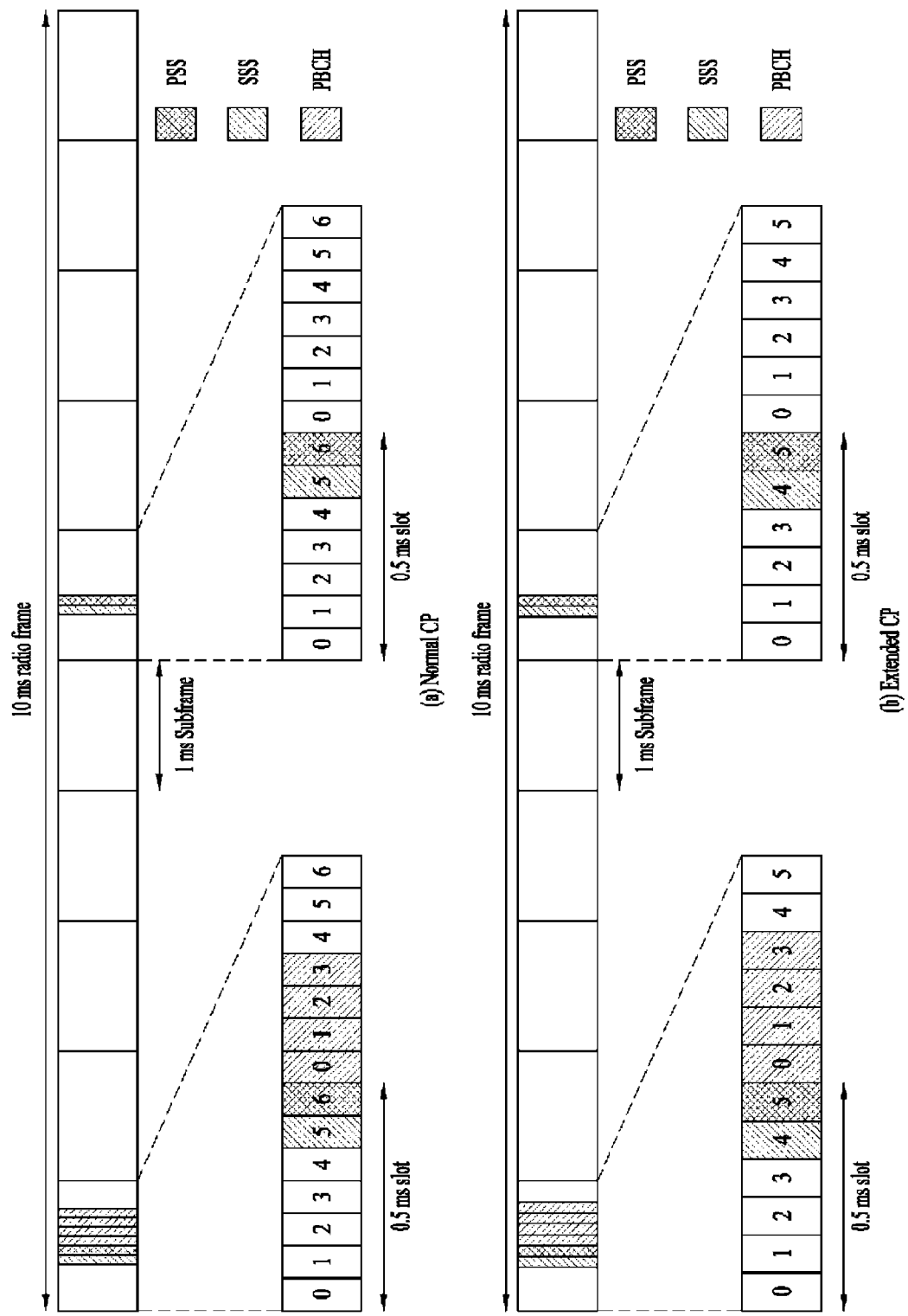
FIG. 6 is a diagram for a structure of a radio frame for a transmission of a synchronization signal (SS).

FIG. 6 is a diagram for one example of a structure of a radio frame for a transmission of a synchronization signal (SS). In particular, FIG. 6 shows one example of a radio frame structure for transmission of a synchronization signal and PBCH in frequency division duplex (FDD). FIG. 6(a) shows transmission locations of SS and PBCH in a radio frame configured as a normal CP (cyclic prefix). And, FIG. 6(b) shows transmission locations of SS and PBCH in a radio frame configured as an extended CP.

If a power of a UE is turned on or the UE enters a new cell, the UE performs an initial cell search procedure in a manner of obtaining time and frequency synchronization with the cell, detecting a physical cell identity of the cell, and the like. To this end, the UE matches synchronization with an eNB by receiving synchronization signals (e.g., a primary synchronization signal (PSS) and a secondary synchronization signal) from the eNB and is then able to obtain information such as a cell identity (ID) and the like.

SS (synchronization signal) is further described in detail with reference to FIG. 6 as follows. First of all, the SS can be classified into a PSS and an SSS. The PSS is used to obtain OFDM symbol synchronization such as OFDM symbol synchronization, slot synchronization and the like and/or frequency domain synchronization. And, the SSS is used to obtain frame synchronization, cell group ID and/or cell's CP configuration (i.e., use information of a normal CP or use information of an extended CP). Referring to FIG. 6, the PSS and the SSS are transmitted in 2 OFDM symbols of each radio frame, respectively. In particular, in consideration of 4.6 ms of a GSM (global system for mobile communication) frame length in consideration of facilitation of an inter-RAT (radio access technology) measurement, the SS is transmitted in each of a 1$^{st}$ slot of a subframe 0 and a 1$^{st}$ slot of a subframe 5. Particularly, the PSS is transmitted in each of a last OFDM symbol of the 1st slot of the subframe 0 and a last OFDM symbol of the 1$^{st}$ slot of the subframe 5. And, the SSS is transmitted in each of a last 2$^{nd}$ OFDM symbol of the 1$^{st}$ slot of the subframe 0 and a last 2$^{nd}$ OFDM symbol of the 1$^{st}$ slot of the subframe 5. A boundary of a corresponding radio frame can be detected through the SSS. The PSS is transmitted in a far last OFDM symbol of the corresponding slot, while the SSS is transmitted in an OFDM symbol previous to the PSS. A transmit diversity scheme of SS uses a single antenna port only and is not separately defined in the standard. In particular, a single antenna port transmission scheme or a UE-transparent transmission scheme (e.g., PVS (precoding vector switching), TSTD (time switched diversity), CDD (cyclic delay diversity)) can be used for the transmit diversity of the SS.

SS can indicate total 504 unique physical layer cell identities (IDs) through a combination of 3 PSS and 168 SS. So to speak, the physical layer cell IDs are grouped into 168 physical-layer cell-ID groups, each of which include 3 unique IDs to enable each physical layer cell ID to becomes a part of a single physical-layer cell-ID group only. Hence, a physical layer cell ID $N^{cell}_{ID}$ ($=3N^{(1)}_{ID}+N^{(2)}_{ID}$) is uniquely defined by the number $N^{(1)}_{ID}$ in a range from 0 to 167, each of which indicates a physical-layer cell-ID group, and the number $N^{(2)}_{ID}$ ranging from 0 to 2, each of which indicates the physical-layer ID in the physical-layer cell-ID group. The UE can be aware of one of the 3 unique physical-layer IDs by detecting the PSS and is able to identify one of the 168 physical layer cell IDs associated with the physical-layer ID by detecting the SSS. ZC (Zadoff-Chu) sequence having a length of 63 is defined in a frequency domain and used as PSS. For instance, the ZC sequence can be defined by the following formula.

$$d_u(n) = e^{-j\frac{\pi u n(n+1)}{N_{ZC}}} \quad \text{[Formula 1]}$$

In this case, $N_{ZC}=63$. And, 'n=3', which is a sequence element corresponding to DC subcarrier, is punctured.

The PSS is mapped to 6 RBs (=72 subcarriers) close to a center frequency. The remaining 9 subcarriers among the 72 subcarriers always carry value of 0, which works as an element for facilitating a filter design for synchronization execution. In order to define total 3 PSS, 'u=24', 'u=29' and 'u=34' are used for Formula 1. Since 'u=24' and 'u=34' have a relation of conjugate symmetry, 2 correlations can be simultaneously performed. In this case, the conjugate symmetry means the relation of the following formula.

$$d_u(n)^n = (-1)^n(d_{N_{ZC}-u}(n))^*, \text{ when } N_{ZC} \text{ is even number}$$

$$d_u(n) = (d_{N_{ZC}-u}(n))^*, \text{ when } N_{ZC} \text{ is odd number} \quad \text{[Formula 2]}$$

If the property of the conjugate symmetry is used, it is able to implement a one-shot correlator for u=29 and u=34. This can reduce about 33.3% of an overall operation quantity in comparison with the case of absence of the conjugate symmetry.

In more particular, a sequence d(n) used for PSS is generated from a frequency domain ZC sequence by the following formula.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Formula 3]}$$

In this case, ZC root sequence index u is given according to the following table.

TABLE 3

| $N^{(2)}$ ID | Root index u |
|---|---|
| 0 | 25 |
| 1 | 29 |
| 2 | 34 |

Referring to FIG. 6, since PSS is transmitted each 5 ms, a UE detects the PSS to be aware that a corresponding subframe is one of a subframe 0 and a subframe 5. Yet, the UE is not aware that the corresponding subframe is either the subframe 0 or the subframe 5. Hence, the PSS is not enough for the UE to recognize a boundary of a radio frame. In particular, it is unable to obtain frame synchronization from PSS only. The UE detects the boundary of the radio frame by detecting SSS transmitted in different sequences twice in one radio frame.

Figure 7:
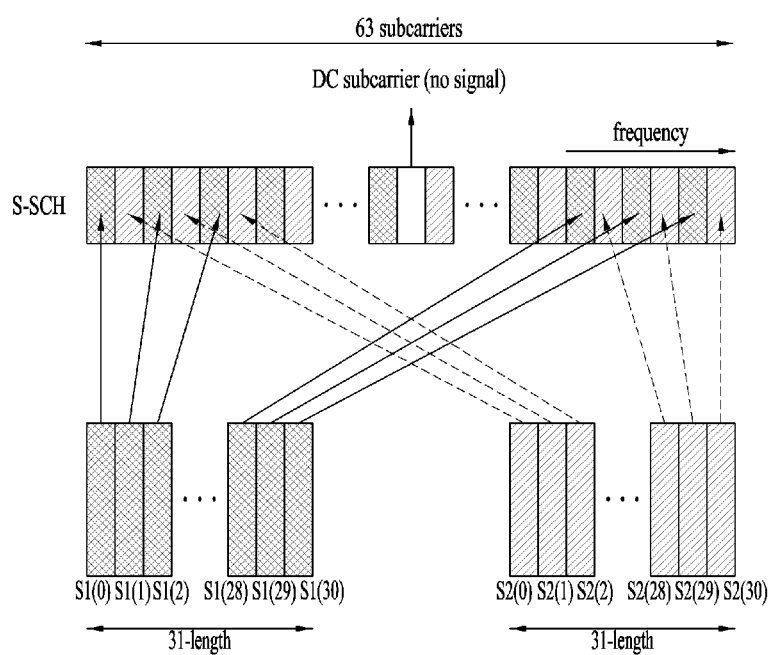
FIG. 7 is a reference diagram to describe a method of generating a secondary synchronization signal (SSS).

FIG. 7 is a reference diagram to describe a method of generating a secondary synchronization signal (SSS). Particularly, FIG. 7 shows a relation in mapping 2 sequences in a logical domain to a physical domain.

A sequence used for SSS is an interleaved concatenation of two m-sequences of length 31. And, the concatenated sequence is scrambled by a scrambling sequence given by PSS. In this case, the m-sequence is a sort of a PN (Pseudo Noise).

Referring to FIG. 7, assuming that two m-sequences used for SSS code generation are set to S1 and S2, respectively, S1 and S2 are scrambled for SSS by two different PSS based sequences. In doing so, S1 and S2 are scrambled by different sequences, respectively. A PSS based scrambling code can be obtained by cyclically shifting m-sequence generated from a polynomial $x^5+x^3+1$, and 67 sequences are generated by a cyclic shift of the m-sequence according to PSS index. Subsequently, the S2 is scrambled by S1 based scrambling code. The S1 based scrambling code can be obtained by cyclically shifting m-sequence generated from a polynomial $x^5+x^4+x^2+x^1+1$, and 8 sequences are generated by cyclic shift of the m-sequence according to an index of the S1. Code of SSS is swapped every 5 ms but PSS based scrambling code is not swapped. For instance, assuming that SSS of a subframe 0 carries a cell group ID with a combination of (S1, S2), SSS of a subframe 5 carries a sequence swapped into (S2, S1). Through this, a boundary of a radio frame of 10 ms can be distinguished. In doing so, a used SSS code is generated from a polynomial $x^5+x^2+1$, and total 31 codescan be generated through different cyclic (or circular) shifts of m-sequence having a length 31.

Combinations of two m-sequences, each of which has a length 31, defining SSS differ from each other in the subframe 0 and the subframe 5, respectively. According to the combinations of the two m-sequences of the length 31, total 168 cell group IDs are represented. The m-sequence used as a sequence of SSS is characterized in being robust against a frequency selective environment. Moreover, since the m-sequence can be transformed by fast m-sequence transform using fast Hadamard transform, if the m-sequence is utilized as SSS, it is able to reduce an operation quantity required for the UE to interpret the SSS. Moreover, as the SSS is configured with two short codes, the operation quantity of the UE can be reduced.

The generation of SSS is described in detail as follows. First of all, a sequence d(0) . . . d(61) used for the SSS is an interleaved concatenation of two length-31 binary sequences. The concatenated sequence is scrambled with a scrambling sequence given by PSS.

Combinations of two length-31 sequences defining PSS differ from each other in subframe 0 and subframe 5 according to the following, respectively.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Formula 4]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In this case, $0 \leq n \leq 30$. Indexes $m_0$ and $m_1$ are derived from a physical-layer cell-ID group $N_{ID}^{(1)}$ according to the following.

$$m_0 = m' \bmod 31$$ [Formula 5]

$$m_1 = (m_0 + \lfloor m'/31 \rfloor + 1) \bmod 31$$

$$m' = N_{ID}^{(1)} + q(q+1)/2,$$

$$q = \left\lfloor \frac{N_{ID}^{(1)} + q'(q'+1)/2}{30} \right\rfloor,$$

$$q' = \lfloor N_{ID}^{(1)}/30 \rfloor$$

An output of Formula 5 is listed on Table 4 next to Formula 11.

Two sequences $S^{(m_0)0}(n)$ and $S^{(m_1)1}(n)$ are defined as two different cyclic shifts of an m-sequence s(n) according to the following.

$$s_0^{(m_0)}(n) = s((n+m_0) \bmod 31)$$

$$s_1^{(m_1)}(n) = s((n+m_1) \bmod 31)$$ [Formula 6]

In this case, '$s(i) = 1 - 2x(i)$ $(0 \leq i \leq 30)$' is defined by the following formula with initial conditions of '$x(0)=0$', '$x(1)=0$', '$x(2)=0$', '$x(3)=0$', and '$x(4)=1$'.

$$x(\bar{i}+5) = (x(\bar{i}+3) + x(\bar{i})) \bmod 2, \ 0 \leq \bar{i} \leq 25$$ [Formula 7]

Two scrambling sequences $c_0(n)$ and $c_1(n)$ depend on PSS and are defined by two different cyclic shifts of an m-sequence c(n) according to the following formula.

$$c_0(n) = c((n+N_{ID}^{(2)}) \bmod 31)$$

$$c_1(n) = c((n+N_{ID}^{(2)}+3)) \bmod 31)$$ [Formula 8]

In this case, $N_{ID}^{(2)} \in \{0, 1, 2\}$ is a physical-layer ID in a physical-layer cell-ID group $N_{ID}^{(1)}$ and '$c(i)=1-2x(i)$ $(0 \leq i \leq 30)$' is defined by the following formula with initial conditions of '$x(0)=0$', '$x(1)=0$', '$x(2)=0$', '$x(3)=0$', and '$x(4)=1$'.

$$x(\bar{i}+5) = (x(\bar{i}+3) + x(\bar{i})) \bmod 2, \ 0 \leq \bar{i} \leq 25$$ [Formula 9]

Scrambling sequences $Z^{(m_0)1}(n)$ and $Z^{(m_1)1}(n)$ are defined by cyclic shifts of an m-sequence z(n) according to the following formula.

$$z_1^{(m_0)}(n) = z((n+(m_0 \bmod 8)) \bmod 31)$$

$$z_1^{(m_1)}(n) = z((n+(m_1 \bmod 8)) \bmod 31))$$ [Formula 10]

In this case, $m_0$ and $m_1$ are obtained from Table 4 disclosed next to Formula 11, and '$z(i)=1-2x(i)$ $(0 \leq i \leq 30)$' is defined by the following formula with initial conditions of '$x(0)=0$', '$x(1)=0$', '$x(2)=0$', '$x(3)=0$', and '$x(4)=1$'.

$$x(\bar{i}+5) = (x(\bar{i}+4) + x(\bar{i}+2) + x(\bar{i}+1) + x(\bar{i})) \bmod 2, \ 0 \leq \bar{i} \leq 25$$ [Formula 11]

TABLE 4

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |

TABLE 4-continued

| $N^{(1)}_{ID}$ | $m_0$ | $m_1$ |
|---|---|---|
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Having determined the time and frequency parameters required for performing demodulation of DL signal and transmission of UL signal at accurate timing points by performing a cell search procedure using SSS, a UE can communicate with an eNB only if obtaining system information required for system configuration of the UE from the eNB as well.

System information is configured with Master Information Block (MIB) and System Information Blocks (SIBs). Each of the system information blocks includes an assortment of functionally associated parameters and is assorted into one of Master Information Block (MIB), System Information Block Type 1 (SIB1), System Information Block Type 2 (SIB2), and SIB3~SIB8 according to the included parameters. MIB includes most frequently transmitted parameters mandatory for a UE to perform an initial access to a network of an eNB. SIB1 includes parameters required for determining whether a specific cell is a cell appropriate for a cell selection as well as information on time domain scheduling of other SIBs.

UE can receive MIB through a broadcast channel (e.g., PBCH). In the MIB, a downlink system bandwidth (dl-Bandwidth, DL BW), PHICH configuration and a system frame number (SFN) are included. Hence, the UE can be explicitly aware of information on the DL BW, the SFN and the PHICH configuration by receiving the PBCH. Meanwhile, information implicitly known to the UE through the reception of the PBCH may include the number of transmitting antenna ports of an eNB. The information on the transmitting antennas of the eNB is implicitly signaled by masking 16-bit CRC (Cyclic Redundancy Check) with a sequence corresponding to the transmitting antenna number [e.g., XOR operation].

PBCH is mapped to 4 subframes for 40 ms. The time of 40 ms is blind-detected and an explicit signaling of the time of 40 ms does not exist separately. The PBCH is transmitted in OFDM symbols 0 to 3 of a slot 1 ($2^{nd}$ slot of subframe 0) within the subframe 0 of a radio frame.

In frequency domain, PSS/SSS and PBCH are transmitted on total 6 RBs including 3 right RBs and 3 left RBs centering on a DC subcarrier within a corresponding OFDM symbol, i.e., on total 72 subcarriers only irrespective of an actual system bandwidth. Hence, a UE is configured to be able to detect or decode SS and PBCH irrespective of a DL transmission bandwidth configured for the UE.

Having accessed the network of the eNB after finishing the initial cell search, the UE can more specific system information by receiving PDCCH and PDSCH according to information carried on the PDCCH. Thereafter, having performed the above-mentioned procedure, the UE can perform PDCCH/PDSCH reception and PUSCH/PUCCH transmission as a general UL/DL signal transmitting procedure.

Figure 8:
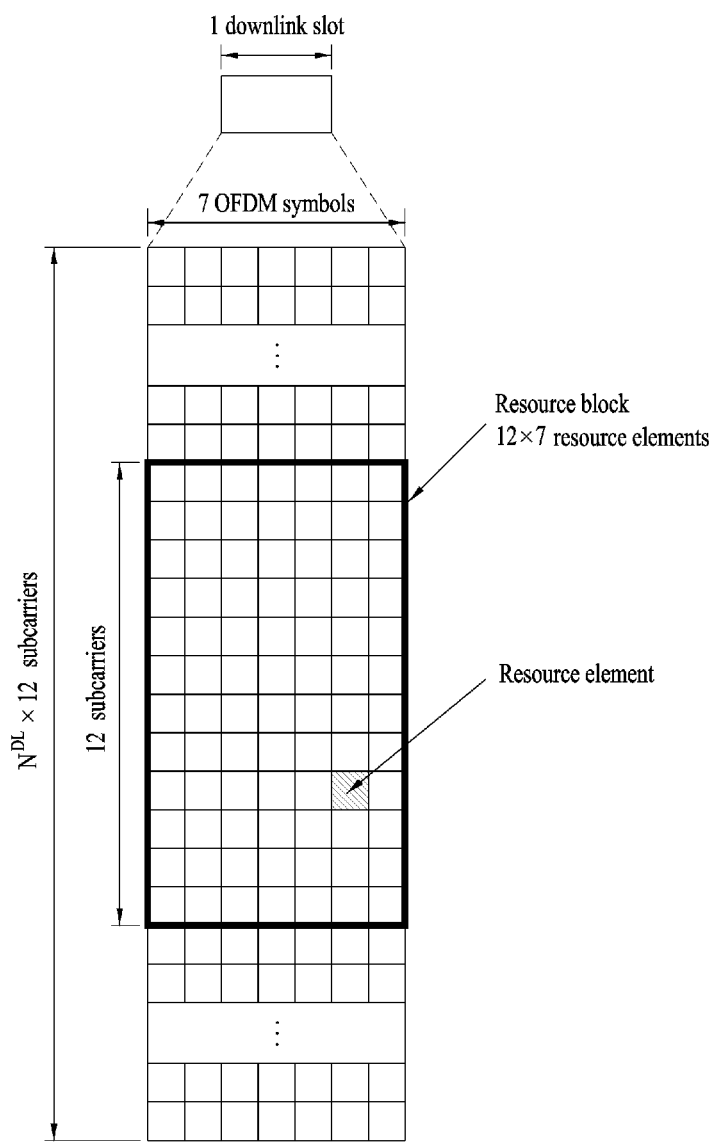
FIG. 8 is a diagram of a resource grid for a downlink slot.

FIG. 8 is a diagram of a resource grid for a downlink slot.

Referring to FIG. 8, a DL slot includes $N^{DL}_{symb}$ OFDM symbols in time domain and $N^{DL}_{RB}$ resource blocks. Since each of the resource blocks includes $N^{RB}_{sc}$ subcarriers, the DL slot includes $N^{DL}_{RB} \times N^{RB}_{sc}$ subcarriers in frequency domain. FIG. 8 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N^{DL}_{symb} \times N^{RB}_{sc}$ resource elements. The number $N^{DL}_{RB}$ of resource blocks included in the DL slot depends on a DL transmission bandwidth configured in a cell.

Figure 9:
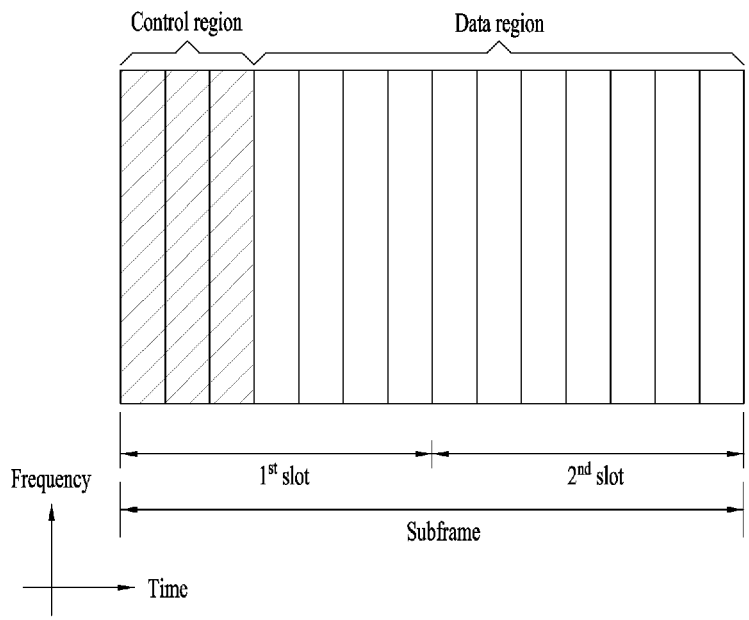
FIG. 9 is a diagram for one example of a structure of a downlink subframe.

FIG. 9 is a diagram for one example of a structure of a downlink subframe.

Referring to FIG. 9, maximum 3 (or 4) OFDM symbols situated at a head part of a $1^{st}$ slot of a subframe correspond to a control region to which a control channel is assigned. And, the rest of OFDM symbols correspond to a data region to which PDSCH (physical downlink shared channel) is assigned. For example, DL control channels used by 3GPP LTE may include PCFICH (Physical Control Format Indicator Channel), PDCCH (Physical Downlink Control Channel), PHICH (Physical hybrid ARQ indicator Channel) and the like. The PCFICH is transmitted on a 1st OFDM symbol of a subframe and carries information on the number of OFDM symbols used for a control channel transmission in the subframe. The PHICH carries HARQ ACK/NACK (acknowledgment/negative-acknowledgment) signal in response to a UL transmission.

Control information transmitted on PDCCH is called DCI (downlink control information). The DCI includes resource allocation information and other control informations for a user equipment or a user equipment group. For instance, the DCI may include UL/DL scheduling information, UL transmission (Tx) power control command and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

Figure 10:
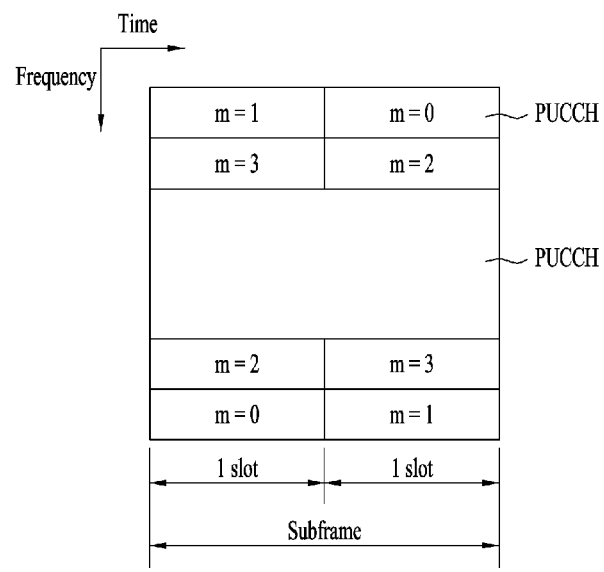
FIG. 10 is a diagram for a structure of an uplink subframe used in LTE.

FIG. 10 is a diagram for a structure of an uplink subframe used in LTE.

Referring to FIG. 10, a UL subframe includes a plurality of slots (e.g., 2 slots). Each of the slots can include SC-FDMA symbols of which number varies in accordance with a CP length. The UL subframe is divided into a data region and a control region in a frequency domain. The data region includes PUSCH and is used to transmit such a data signal as audio and the like. The control region includes PUCCH and is used to transmit uplink control information (UCI). The PUCCH includes an RB pair situated at both end portions of the data region on a frequency axis and hops using a slot as a boundary.

PUCCH can be used to transmit the following control information.

SR (scheduling request): This is information used to request an uplink UL-SCH resource. This is transmitted by OOK (on-off keying).

HARQ ACK/NACK: This is a response signal for a DL data packet on PDSCH. This indicates whether the DL data packet is successfully received. In response to a single DL codeword, 1-bit ACK/NACK is transmitted. In response to two DL codewords, 2-bit ACK-NACK is transmitted.

CQI (channel quality indicator): This is the feedback information on a DL channel. The CSI includes CQI (channel quality indicator). MIMO (multiple input multiple output) related feedback information includes RI (rank indicator), PMI (precoding matrix indicator), PTI (precoding type indicator) and the like. 20 bits are used per subframe.

A size of control information (UCI) transmittable in a subframe by a user equipment depends on the number of SC-FDMAs available for a control information transmission. The SC-FDMA available for the control information transmission means SC-FDMA symbols remaining after excluding SC-FDMA symbols for a reference signal transmission from a subframe. In case of an SRS (sounding reference signal) configured subframe, a last SC-FDMA symbol of the subframe is excluded as well. A reference signal is used for coherent detection of PUCCH.

In the following description, a method for user equipments, which perform D2D (Device to Device) communication proposed by the present invention, to perform synchronization with each other is explained.

Since a D2D user equipment (UE) uses a transmission power lower than that of a base station, they have relatively low signal strength. In this case, as a synchronization reference signal is repeatedly transmitted several times in order to D2D UEs at low SINR to be synchronized, it is preferable that a receiving UE can operate to enable sufficient synchronization in a low SINR area using the repeated RS together. In doing so, if a UE configured to transmit a reference signal (RS) has multiple antennas, as a precoding is differently applied to a portion or whole of the repeated reference signals (this may be construed as a reference signal transmitting antenna port is changed), a channel provided with a precoding applied to a reference signal transmission does not stay in an inappropriate state but a precoding appropriate for a provided channel state can be applied to at least one portion of the reference signals.

According to the present invention mentioned in the following description, in case that synchronization reference signals are repeatedly transmitted several times, a method of changing a precoding of each reference signal transmission appropriately is proposed to enable a receiving user equipment to obtain or acquire synchronization more effectively. In this case, a synchronization reference signal for D2D may be named a D2DSS (D2D synchronization signal). As a synchronization signal is classified into PSS or SSS, D2DSS can be classified into a primary D2DSS (PD2DSS) or a secondary D2DSS (SD2DSS). Moreover, although the present invention is described with reference to an LTE wireless communication system, the basic principles of the present invention can be exactly applied to other wireless communication systems as well as to the LTE wireless communication system.

Moreover, PSS of the present invention can be construed as meaning PD2DSS used for a D2D communication as well as PSS on a legacy system. Likewise, SSS is construed as meaning SD2DSS used for a D2D communication.

Figure 11:
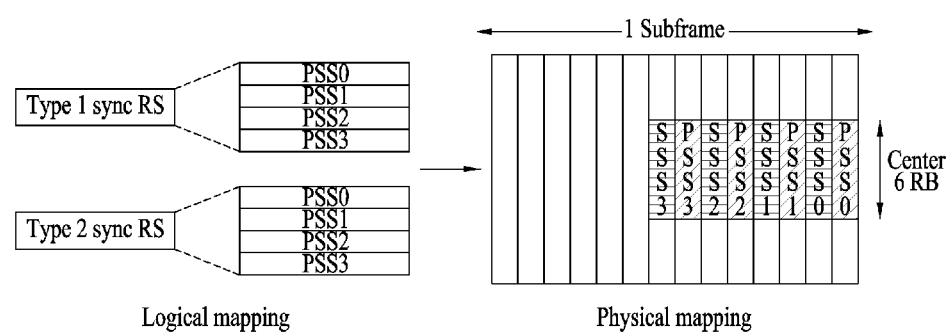
FIG. 11 shows a location of PSS/SSS corresponding to a synchronization reference signal in LTE wireless communication system and a structure of D2D synchronization reference signal based on the location.

FIG. 11 shows a location of PSS/SSS corresponding to a synchronization reference signal in LTE wireless communication system and a structure of D2D synchronization reference signal repeated 4 times using the location intact.

Referring to FIG. 1, each of a type 1 synchronization reference signal and a type 2 synchronization reference signal configured with 4 PSS/SSS in a logical domain, which are interleaved with each other on contiguous symbols in a physical domain by being assigned to 1 symbol each. Moreover, FIG. 11 shows one example of a case that a reference signal ends on a far last symbols of a frame in various assigning methods of a logical domain based physical domain (i.e., logical→physical). Yet, the disposition shown in FIG. 11 is just one example, and the PSS & SSS repeated count and a location in a subframe can be changed into other forms.

First of all, like a cellular base station, when PSS and SSS are used once only, if an SNR value is low, they fail to be synchronized and wait for a next PSS. In case of a cellular situation, since such an operation enables an eNB to consistently transmit PSS/SSS (e.g., 1 time in 5 ms), a user equipment can re-detect PSS/SSS transmitted in a relatively short time, it may not cause a serious problem. Yet, in a D2D communication in consideration of a disaster situation or an emergency situation, a PSS/SSS redetection operation of a cellular type may become a problem. Since battery consumption is too large in order for a D2D transmitting UE to consistently transmit PSS/SSS like an eNB, it is more preferable that a synchronization reference signal is transmitted intermittently (e.g., 1 time in 100 ms).

Hence, in a D2D communication, it is necessary to secure diversity that constantly operates in channel states of various types. Moreover, it may frequently happen that SINR of a D2D synchronization signal (i.e., D2D sync SINR) has a reception SINR lower than that of a synchronization signal on a cellular communication. To complement such a case, it is necessary to raise a reception power through a combining gain. In particular, in FIG. 11, in case of combining the respective signals together, it is able to achieve synchronization by obtaining a more power (e.g., maximum 4 times more) at the same reception SINR.

In the following description, legacy PSS and legacy SSS will be used for example to describe disposition of a D2D synchronization (sync) signal (D2DSS). Yet, it is not mandatory to use the legacy PSS/SSS or a combination thereof. For instance, it is able to use a progression of DMRS. In case of using such a signal as SRS or PRS, the same description is applicable. Moreover, a progression of legacy PSS/SSS is not used intactly but can be used in a manner of amending at least one of: i) a change of a sequence length; ii) a change of an ID (i.e., a root index) of a sequence; iii) a change of a cyclic shift; iv) a change of a repetition count; v) a change of a transmission location (time or/and frequency); and vi) a change of transmission periodicity. Through this, PD2DSS or SD2DSS can be distinguished from legacy PSS or SSS in aspect of sequence. Having detected this, a UE can recognize whether a corresponding sequence is PSS/SSS transmitted from an eNB or DD2DSS transmitted from a UE.

In particular, regarding ID (i.e., root index) of a sequence, 3 values and 168 values are set for legacy PSS and legacy SSS, respectively. In D2D, the number of ID values of sequences for the legacy PSS/SSS may be limited. For instance in a cellular communication, if a user equipment detects PSS/SSS once, it is unnecessary to redetect PSS/SSS except special cases (e.g., handover, radio link failure, cell reselection, etc.) of losing synchronization. On the other hand, in D2d communication, it is necessary to periodically redetect a D2D synchronization signal for redistribution of the limited D2D resources. Hence, in order to reduce complexity of a blind detection for detecting a sequence ID, it is able to limit the number of sequence IDs. For example, in detail, the number of PSS reuses a previous number '3' intact. Yet, a set $\{0, \ldots, 167\}$ is divided into 3 sets $\{3n\}$, $\{3n+1\}$ and $\{3n+2\}$ and one ID set (i.e., 56 IDs) of the 3 sets may be used for the number of SSS only. Of course, a method of limiting ID of SSS is non-limited by the above example but can be defined as a set having the same remainder for a natural number K like the above description. Moreover, ID value of a specific section may be selected in a manner of dividing the set into $\{0, \ldots, K-1\}$, $\{K, 2K-1\}, \ldots, \{167-K, 167\}$ by predetermined sections. Of course, it is able to limit the number of sequence ID values in a manner of enabling SD2DSS to maintain the same number 168 of SSS and decrementing the number of PD2DSS to be smaller than 3.

For clarity of the following description, a process for a user equipment to detect synchronization (sync) is explained. First of all, assume that the number of repetitions of a synchronization reference signal and a repetition periodicity/method of the synchronization reference signal are shared between D2D user equipments. A user equipment mainly obtains or acquires time sync and frequency sync through a synchronization reference signal.

First of all, a time sync obtaining process is described as follows. While a D2D sync receiving user equipment monitors received signals by a specific method (e.g., filtering, correlation, etc.), it detects a peak of a type 1 reference signal. In doing so, since D2D sync (signal) is transmitted in various symbols, a receiving user equipment has several peaks. Considering peak time differences and peak values, if a corresponding value is equal to or greater than a reference value, the receiving user equipment determines that the synchronization is successfully achieved. If the corresponding value is smaller than the reference value, the receiving user equipment continues the sync (signal) monitoring.

Hence, if the synchronization is determined as successful, the receiving user equipment can set its symbol timing to a timing of maintaining peaks stably in several symbols. In doing so, if the user equipment is in an in-network status, since a timing of a D2D subframe lies within a predetermined error range with a timing of a cellular subframe, it is able to narrow a monitoring interval into an interval, in which a sync signal is estimated as existing, based on a cellular sync. On the other hand, if a UE is out of coverage, since the out-of-coverage UE does not have any information, it has to detect a synchronization reference signal in a wider time interval.

Frequency sync is described as follows. First of all, if a frequency error exists between a transmitting user equipment and a receiving user equipment, it appears in viewpoint of the receiving user equipment in a manner that a phase of a signal changed at a predetermined speed. Hence, the receiving user equipment obtains a time sync first, estimates a channel, on which the signal has propagated, from two symbols. Subsequently, on the assumption that an interval between the corresponding two symbols is very shorter than a time in which attribute of a radio channel actually varies, the receiving user equipment determines that the only reason for changing the channel observed during two symbol durations is a frequency error and then calculates and corrects the frequency error from a phase change value of the corresponding channel observation, thereby obtaining the frequency sync. In doing so, when the transmitting user equipment transmits a synchronization reference signal, if a precoding in specific two symbols is changed, since a transmitting end has already applied a phase change between signals of the two symbols, it may not be preferable that an operation of obtaining a frequency sync through the precoding changed two symbol signals. Hence, the receiving user equipment obtains which reference signal symbol maintains the same precoding in the transmitting end in advance and then obtains a frequency sync using a signal of the corresponding reference signal symbol.

For instance, in case that reference signals are transmitted in total k symbols, the reference signals are divided into L symbol groups, each of which is configured with N reference signals, and the same precoding is applied to the N reference signals belonging to one symbol group. Such a case is described. If so, the receiving user equipment obtains a frequency sync using the reference signals belonging to the same symbol group and is then able to obtain a final frequency sync by synthesizing the frequency syncs obtained for the L symbol groups together, respectively.

Figure 12:
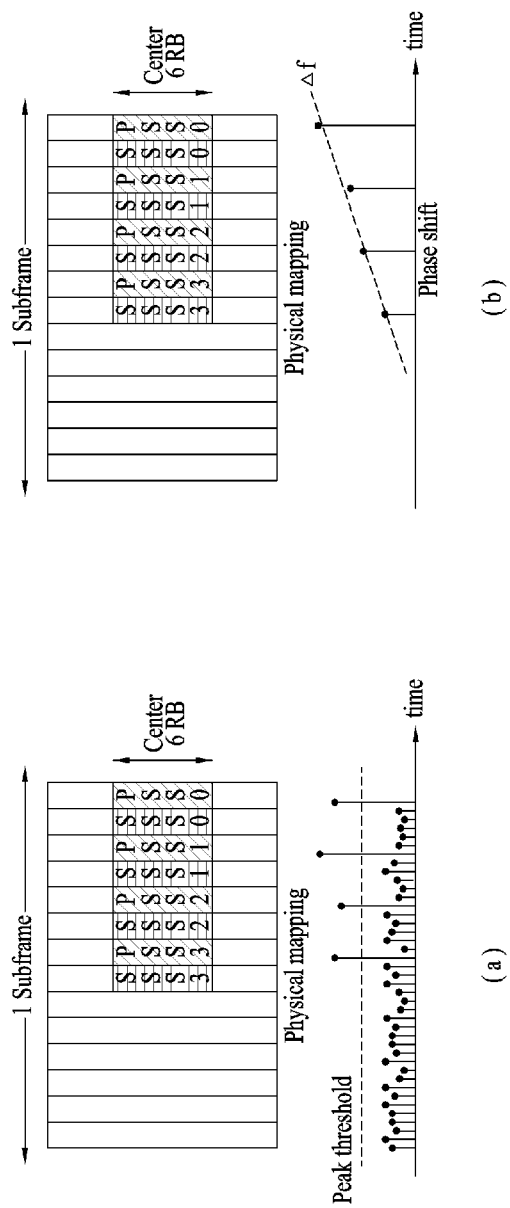
FIG. 12 is a reference diagram to describe a process for obtaining time synch and frequency sync.

FIG. 12 is a diagram to conceptually describe the process for obtaining the time synch and the frequency sync. FIG. 12(a) shows a case that a peaked timing becomes a symbol timing. FIG. 12(b) shows a case that a phase changing slope becomes a frequency error $\Delta f$.

In particular, referring to FIG. 12, a user equipment has several peaks in a process for detecting a type 1 sync reference signal (type1 sync RS) and the corresponding values follow a symbol timing. In particular, in the process for detecting the type 1 sync signal (type1 sync RS), the user equipment performs a CP length detection. Hence, a type 2 sync signal (type2 sync RS) is not used for the usage of CP length detection but is used for the usage of D2D communication type classification, UE ID identification, or sync assistance. Exceptionally, if periodicity of reference signal repetition is exactly equal to slot periodicity, since it is unable to detect a CP length through a time difference of peaks, it is mandatory to use a type 2 reference signal (type2 RS).

Meanwhile, cellular PSS and cellular SSS are transmitted in a manner of being selected from 3 progressions and 168 progressions, respectively. On the other hand, in a D2D situation, since a cluster head carries a sync reference signal (sync RS) only by clustering D2D user equipment, the number of SSS can be further decremented smaller than 168. Moreover, the number of combinations of PSS and SSS is closely related to a size (ID, presence or non-presence of unicast/broadcast/groupcast) of information intended to be transmitted by a Tx user equipment. Since D2D needs information (e.g., shorter ID) much simpler than that for a cellular base station only, it is preferable to reduce the number of SSS in aspect of power loss due to complexity. Extremely, if PSS is used twice instead of SSS, it may be able to finish the sync detection with total 9 (=3×3) kinds of hypothesis texts only.

Meanwhile, various types can be considered as assignment patterns for assigning a type 1 synchronization reference signal (type1 sync RS) and a type 2 synchronization reference signal (type2 sync RS) to a physical domain from a logical domain (i.e., logical→physical).

First of all, for clarity of the description, assume that a type 1 synchronization reference signal (e.g., PSS or PD2DSS) and a type 2 synchronization reference signal (e.g., SSS or SD2DSS) are repeated N times in a single subframe. In this case, the type 1 synchronization reference signal and the type 2 synchronization reference signal are distinguished from each other for the corresponding usage only and may include the same sequence. For instance, if both of the type 1 and the type 2 use PSS, slot boundary, symbol timing, CP length detection and the like can be performed without problems. Moreover, both of the type 1 (type1) and the type 2 (type2) may use SSS.

Figure 13:
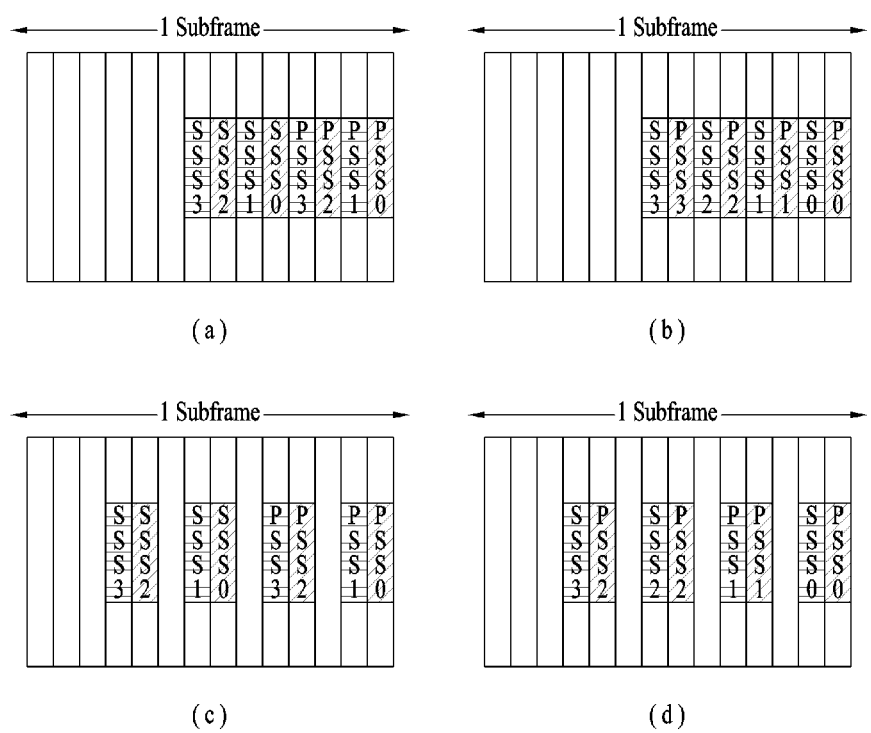
FIG. 13 shows a case of disposing a synchronization reference signal according to the present invention.

FIG. 13 shows a case of disposing a synchronization reference signal according to the present invention. In particular, FIG. 13 shows one example of implementing a case of repeating a reference signal 4 times. In FIG. 13, the type 1 synchronization reference signal and the type 2 synchronization reference signal mentioned in the foregoing description are combined and repeated N times. FIG. 13(a) shows a method of preferentially disposing reference signals of the same type on contiguous symbols. FIG. 13(b) shows a method of alternately disposing the type 1 synchronization reference signal and the type 2 synchronization reference signal on contiguous symbols. FIG. 13(c) sows a method of sequentially disposing reference signals spaced apart from each other in a predetermined distance (in a single subframe). FIG. 13(d) shows a method of alternately disposing reference signals spaced apart from each other in a predetermined distance (in a single subframe). Moreover, there is a method of performing the above-listed methods shown in FIGS. 13(a) to 13(d) by subframe units.

In this case, if contiguous symbols are used for D2DSS, as shown in FIG. 13(a) or FIG. 13(b), since symbols failing to have D2DSS located thereat are contiguous as well, it is advantageous in that the symbols can be easily used for transmission usages of different signals. On the other hand, if D2DSS symbols are disposed by being spaced apart from each other in a predetermined distance, as shown in FIG. 13(c) or FIG. 13(d), it is advantageous in that the frequency error estimation described with reference to FIG. 12(b) can be performed more precisely by observing a phase change of D2DSS spaced by the corresponding interval. If signals of the same type are disposed on the adjacent symbols, as shown in FIG. 13(a) or FIG. 13(c), since a channel change between the same type signals gets smaller, it becomes easier to receive the same type signals combined together. On the other hand, if signals of different types are disposed on adjacent symbols, as shown in FIG. 13(b) or FIG. 13(d), the signal of one type is detected first and the signal of the other type can be then detected more stably using a result of the channel estimation. Thus, such an operation is advantageously enabled. For a final symbol disposition of D2DSS, it is preferable that an appropriate method is selected in consideration of the above-mentioned advantages and disadvantages.

For clarity of the description with reference to FIG. 13, it is depicted that a transmission of a reference signal is ended at a last symbol of a subframe according to each of the methods, by which the present embodiment is non-limited. For instance, in case that a D2D subframe is switched to a cellular subframe, since it may happen that a last symbol of the D2D subframe causes interference to a $1^{st}$ symbol of the cellular subframe, the D2D subframe may be left unused or may be utilized for another usage. Likewise, in case that the cellular subframe is switched to the D2D subframe, it is necessary to empty a $1^{st}$ symbol (of the D2D subframe). Hence, in this case, both end symbols of a subframe are emptied and assignment may be performed on the middle. As a result, a location of a symbol in which PSS/SSS for a prescribed D2D may correspond to a location of a random symbol in the subframe. According to the examples shown in FIG. 13, SSS is represented to precede PSS. Yet, the location of PSS/SSS shows the same synchronization performance in the switched system. And, the number of repetitions of PSS and SSS may be determined as a value other than '4' shown in FIG. 13 in accordance with a relation between an overhead of a resource occupied by D2DSS and a synchronization performance.

In a legacy cellular system, as PBCH is transmitted behind PSS/SSS, basic informations (e.g., bandwidth (BW), antenna configuration, system frame number, etc.) required for an eNB communication are received. Likewise, D2DSS (D2D sync signal) corresponding to a synchronization signal exists in a D2D system, which is configured with PD2DSS (Primary D2DSS) and SD2DSS (Secondary D2DSS). Moreover, in some cases, the SD2DSS may be omitted. For instance, in case of in-NW, in order to save a transmission power, PD2DSS is transmitted only but a transmission of SD2DSS can be omitted.

Moreover, in addition to D2DSS, it is necessary to transmit informations (e.g., a presence of non-presence of broadcast/groupcast/unicast, a presence or non-presence of safety/non-public safety, a D2D bandwidth, a D2D ID, a CP length, etc.) related to D2D. This is named D2DSCH (D2D sync channel) in the following description. In doing so, if a separate reference signal (e.g., DMRS) is used to decode the D2DSCH, since an additional resource is wasted correspondingly, it is preferable that D2DSS is used not only for the purpose of synchronization but also for the usage of channel estimation. In this case, in order to maximize performances of D2DSS and D2DSCH, various arrangements can be considered.

Figure 14:
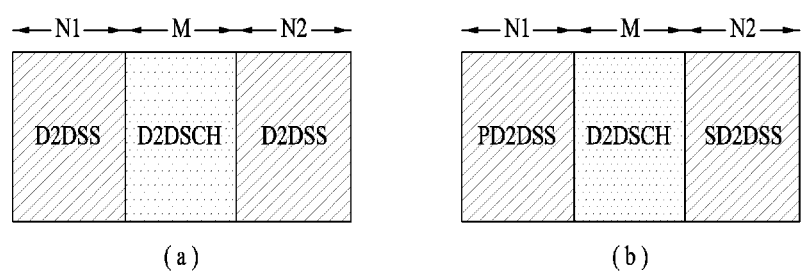
FIG. 14 shows a case of assigning D2DSCH to M symbols located in the middle and using N1 symbols located left and N2 symbols located right as D2DSS.

FIG. 14 shows a case of assigning D2DSCH to M symbols located in the middle and using N1 symbols located left and N2 symbols located right as D2DSS. Referring to FIG. 14(a) and FIG. 14(b), N1 symbols on the right side and N2 symbols on the right side are configured as the same D2DSS, and more particularly, PD2DSS like FIG. 14(a) or may appear in a manner that PD2DSS (Primary D2DSS) and SD2DSS (Secondary D2DSS) are mixed with each other. Alternatively, N1 symbols on the right side and N2 symbols on the right side may appear in a manner that PD2DSS exist in the $1^{st}$ N1 symbols only and that SD2DSS exist in the last N2 symbols like FIG. 14(b). Of course, as mentioned in the foregoing description, since the $1^{st}$ symbol and/or the last symbol in a single D2D subframe may have difficulty in being used intactly due to a switching between a transmitting operation and a receiving operation or the like, those symbols may be excluded from the disposition of D2DSS.

Moreover, D2DSS has two types such as PD2DSS (Primary D2DSS) and SD2DSS (Secondary D2DSS), which may correspond to PSS and SSS of the legacy LTE, respectively. In consideration of detection complexity, the PD2DSS have a small number of root indexes and the SD2DSS have a large number of root indexes.

In this case, a channel estimation performance is achieved using D2DSS entirely or in part. In particular, when several D2DSS are transmitted in the same resource region, it is preferable that a channel estimation is performed using SD2DSS in the D2DSS only. The reason for this is described as follows. If several D2DSS are transmitted in the same resource region, since PD2DSS have the limited number of root indexes, signals of the same root index are received by SFN (single frequency network) scheme in viewpoint of a receiving user equipment. In particular, since it is unable to know that the PD2DSS is transmitted from which user equipment, it is impossible to perform a channel estimation. On the other hand, since SD2DSS have a multitude of root indexes, they can be transmitted in a manner that the same root indexes avoid overlapping each other. If a channel estimation is performed with reference to a specific root index, it can be performed in a manner of assuming that the rest of signals are interferences. Hence, it is preferable that a UE uses SD2DSS only in measuring a channel state from a D2DSS transmitting UE using D2DSS, which is particularly effective for a decoding of PD2DSCH using D2DSS and/or a measurement of a pathloss with the D2DSS transmitting UE through a reception power measurement of D2DSS.

Figure 15:
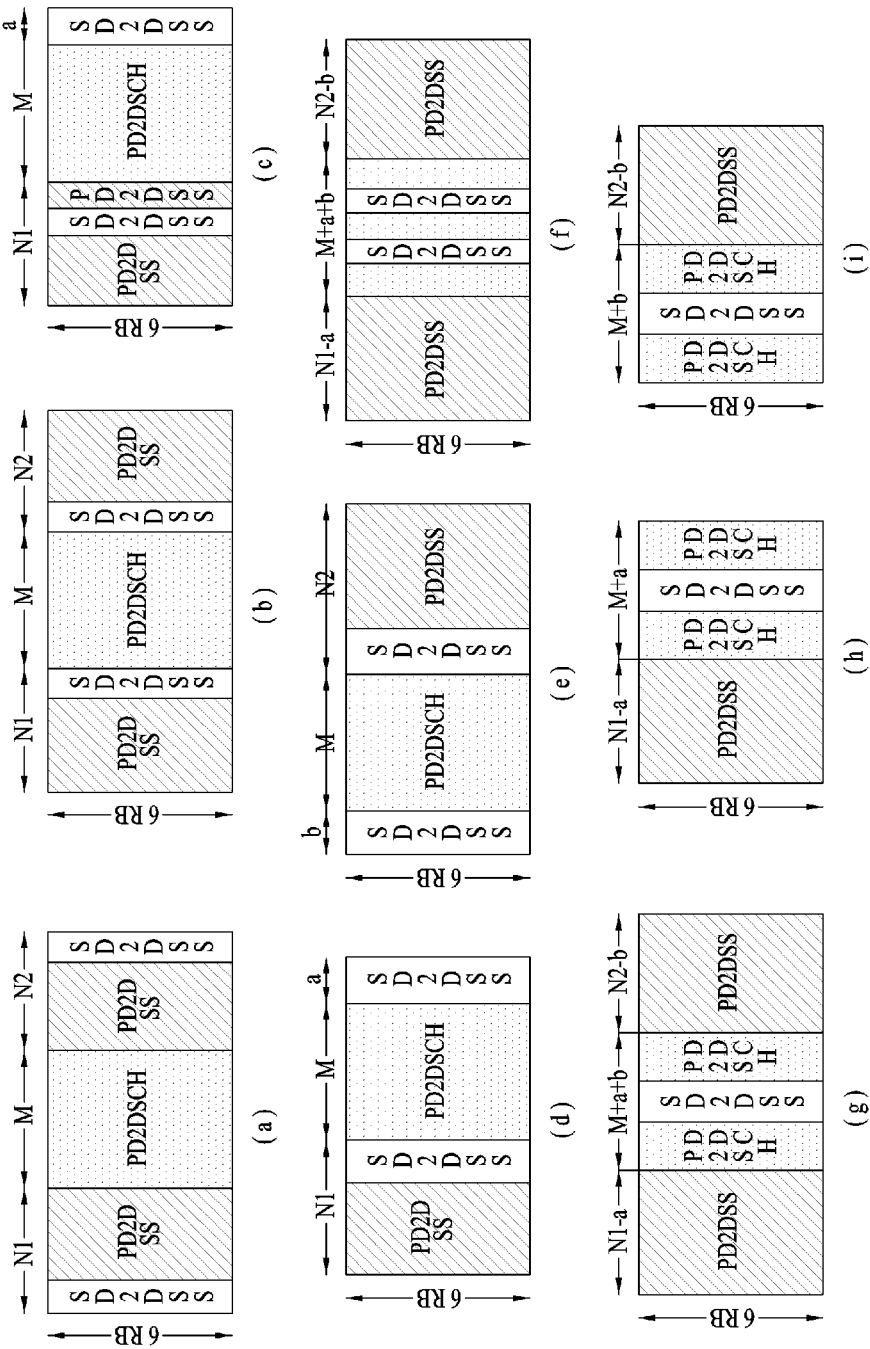
FIG. 15 is a diagram to describe a case that SD2DSS can be located when several D2DSS are carried on the same resource region.

FIG. 15 is a diagram to describe a case that SD2DSS can be located when several D2DSS are carried on the same resource region.

FIG. 15(a) shows a case that SD2DSS is located on an outward edge of a D2DSS location. FIG. 15(b) shows a case that SD2DSS is located on an inward edge of a D2DSS location. After a channel estimation has been performed through SD2DSS enclosing PD2DSCH, it is able to decode the PD2DSCH. Meanwhile, in doing so, since PD2DSS is used for a symbol boundary detection only, it is not necessary for the PD2DSS to be located on both front and rear sides of the PD2DSCH.

Moreover, referring to FIGS. 15(c) to 15(e), PD2DSS can be omitted from the front or rear side. For instance, as shown in FIG. 15(c), SD2DSS may be located between PD2DSS. For instance, as shown in FIG. 15(d) or FIG. 15(e), SD2DSS may be located adjacent to PD2DSCH.

Referring to FIG. 15(f), PD2DSS are located on both front and rear sides of PD2DSCH only and SD2DSS is located on middle symbol(s) of the PD2DSCH.

Finally, referring to FIG. 15(g), SD2DSS are located on middle symbols of PD2DSS. The SD2DSS may be located on a plurality of symbols. Yet, the SD2DSS may occupy a single symbol only. Particularly, in case of using a single symbol only, using a midmost symbol of PD2DSCH is advantageous for a channel estimation. Moreover, if SD2DSS is used in a manner of being located between PD2DSCHs, as shown in FIG. 15(g), it can be used by being combined with one of FIGS. 15(*a*) to 15(*e*). Thus, if the SD2DSS is used by being combined, since it is used for the channel estimation together with SD2DSSs located on both sides, it is unnecessary to use the midmost symbol. FIG. 15(*h*) and FIG. 15(*i*) show dispositions of a configuration in which PD2DSS located on one side shown in FIG. 15(*g*) is omitted.

Besides, the above description with reference to FIG. 15 and the representation of 6 resource blocks (RBs) of the present invention are disclosed for clarity of the description. Although a resource length of D2DSS may be configured as 6 RB applied in the legacy LTE, it is obvious that the present invention is applicable to D2DSS having a length greater or smaller than 6 RB in some cases.

According to the present invention, SD2DSS can be used for frequency synchronization. In this case, a disposition capable of effectively implementing a frequency sync performance is required. In particular, when a frequency sync is estimated, a frequency error on a large scale is detected using a phase difference between adjacent symbols and a frequency on a small scale is detected using a phase difference between symbols spaced apart from each other in a far distance. Assuming that there is a frequency error amounting to 7 kHz for example of the former case (i.e., the frequency error on the large scale), there exists a phase change amounting to 360*7 per 1 ms. Since 1 ms corresponds to 14 symbols in case of a normal CP, there may be a phase change amounting to 180° between the adjacent symbols. After the phase change has been detected, it is restored with the frequency error of 7 kHz. Meanwhile, in order to detect 700 Hz corresponding to the frequency error on the small scale, if SD2DSS spaced art by 10 symbols is used, it is able to detect a phase change amounting to 180°.

Figure 16:
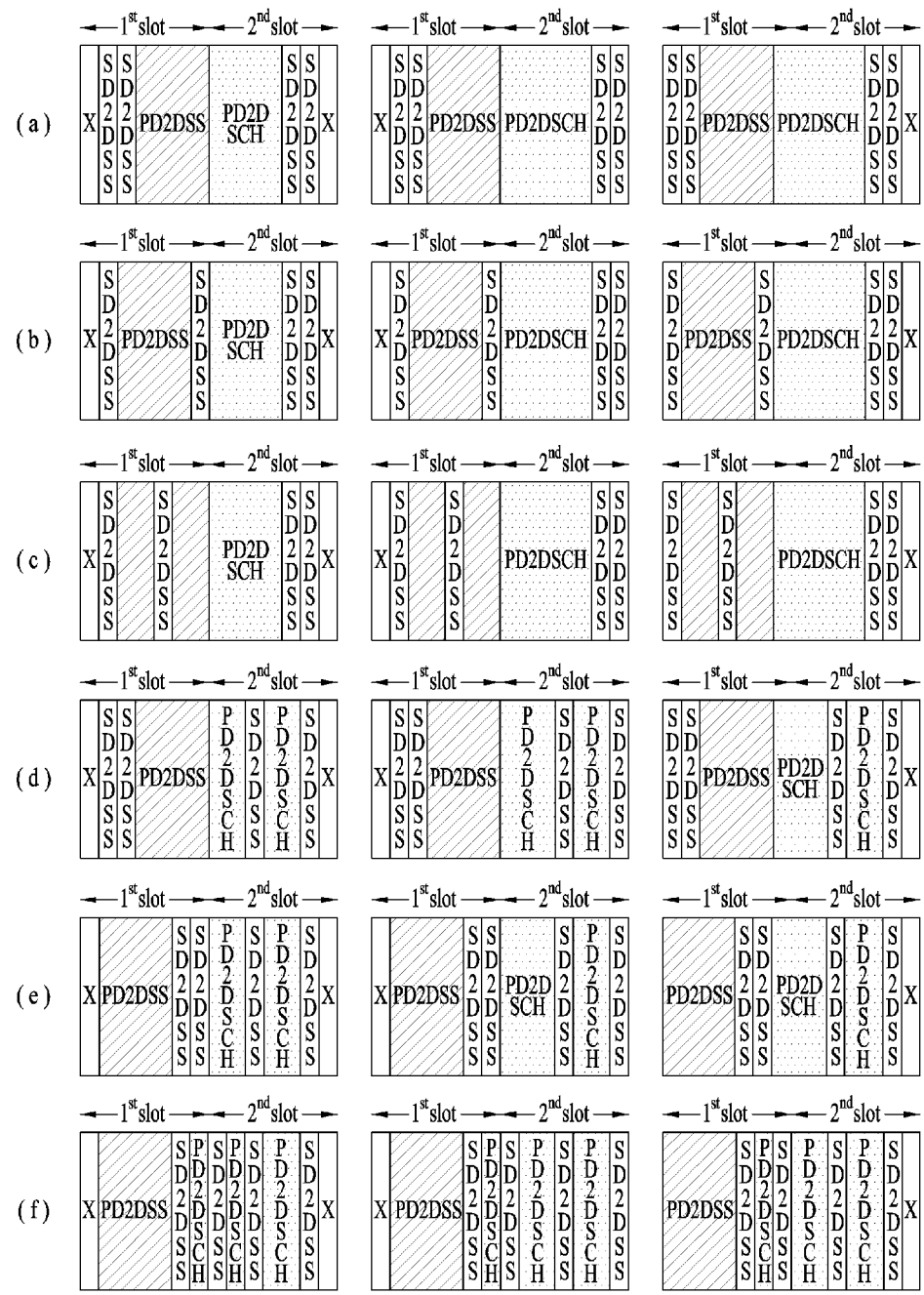
FIG. 16 is a reference diagram to describe a case of using 4 symbols as SD2DSS.

FIG. 16 is a reference diagram to describe a case of using 4 symbols as SD2DSS. In FIGS. 16(*a*) to 16(*f*), a case of assuming that transition symbols (or, switching symbols) are not used by 1 symbol each left to right and front and rear, a case of not using 1 symbol on a front side by regarding it as a transition symbol, and a case of using 1 symbol on a rear side by regarding it as a transition symbol are illustrated in sequence.

In particular, FIG. 16(*a*) shows that SD2DSS is assigned to 2 symbols on each of front and rear sides of an available symbol. In this case, PD2DSS and PD2DSCH are aligned with a slot boundary.

FIGS. 16(*b*) to 16(*d*) show that SD2DSS are disposed in a manner of being spaced apart from each other in predetermined interval. First of all, referring to FIG. 16(*b*), 1 SD2DSS is disposed on a slot boundary and the rest of SD2DSS are maintained intactly as shown in FIG. 16(*a*). In this case, except adjacent SD2DSS, the interval with a closest SD2DSS becomes 4 symbols. FIG. 16(*c*) shows a case that SD2DSS is located in the middle of PD2DSS. In this case, the interval with a closest SD2DSS is 2 symbols. FIG. 16(*d*) shows a case that SD2DSS is located between PD2DSCH. Likewise, the interval with a closest SD2DSS is 2 symbols. In particular, in order to perform frequency estimation with various intervals, FIG. 16(*c*) and FIG. 16(*d*) may be preferable. Yet, if a contiguous channel assignment is important, FIG. 16(*a*) or FIG. 16(*b*) can be selected. FIG. 16(*g*) shows that SD2DSS is assigned to a rear side of PD2DSS for a frequency estimation of a big range rather than a frequency estimation of a small range. FIG. 16(*f*) shows that all SD2DSS are disposed between PD2DSCHs in predetermined interval.

Moreover, in FIG. 16, the assignment order of the rest of symbols except transition symbols may be in reverse order of symbols. In particular, referring to FIG. 16(*b*), for example, if mapping is performed in reverse order of transition-SD2DSS-SD2DSS-PD2DSCH-SD2DSS-PD2DSS-SD2DSS-transition, it is unrelated to synchronization and PD2DSCH decoding performance.

Figure 17:
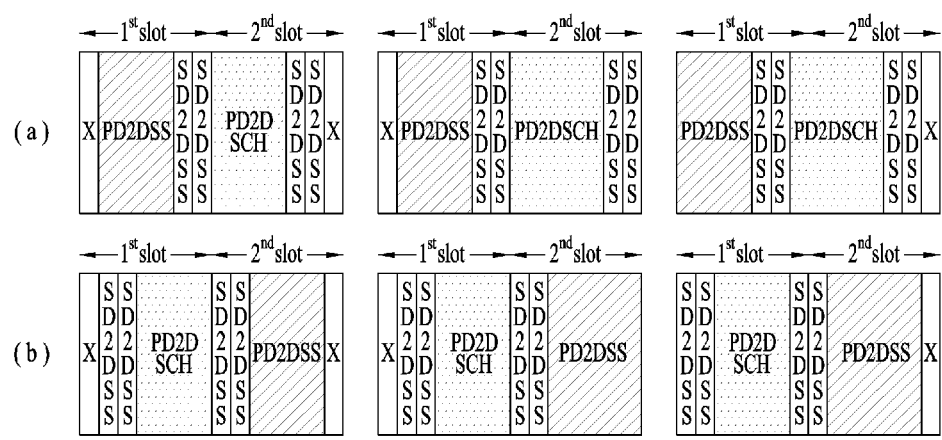
FIG. 17 is a reference diagram to describe a configuration that two SD2DSS enclose PD2DSCH.

Furthermore, FIG. 17 shows the special cases of FIG. 15(*d*) and FIG. 15(*e*) in a configuration that two SD2DSS enclose PD2DSCH. In FIG. 16 and FIG. 17, although it is assumed that SD2DSS is transmitted on 4 symbols, only 2 symbols may be transmitted to reduce resource overhead. In this case, according to the embodiments shown in FIG. 16 and FIG. 17, SD2DSS is transmitted in one of 2 contiguous SD2DSS symbols and the other symbol may be utilized for the usage of PD2DSCH. Such a modification can be easily applied to the embodiments shown in FIG. 16(*a*), FIG. 17(*a*) and FIG. 17(*b*).

In the sync detecting order mentioned in the foregoing description, since PD2DSCH is decoded after detecting PD2DSS and SD2DSS in order, if a detection of PD2DSS is not successful, all subsequent operations (i.e., SD2DSS detection and PD2DSCH decoding) become impossible. Hence, in order to raise PD2SS detection probability, it is necessary to increase the number of PD2DSS.

Figure 18:
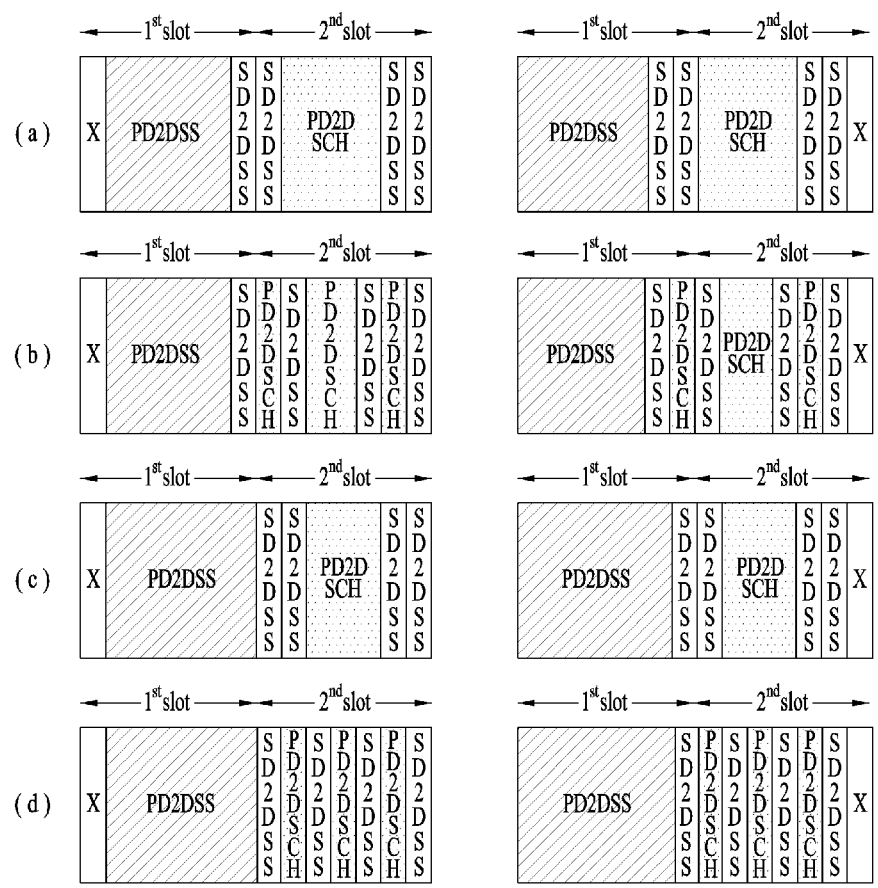
FIG. 18 is a reference diagram to describe a case of assigning PD2DSS to 5 or 6 symbols.

FIG. 18 shows one example of a case of assigning PD2DSS to 5 or 6 symbols. Referring to FIG. 18(*a*) and FIG. 18(*b*), each PD2DSS has 5 symbols and PD2DSCH has a length of 4 symbols. FIG. 18(*a*) shows a case that SD2DSS are located on both sides of PD2DSCH. FIG. 18(*b*) shows a case that SD2DSS and PD2DSCH are mixed with each other. In this case, referring to FIG. 18(*b*), PD2DSCH located in the midmost has a size of 2 symbols, which is to maximally utilize channel estimation performance of the SD2DSS located to left/right side of the corresponding PD2DSCH.

FIG. 18(*c*) and FIG. 18(*d*) show case that PD2DSS has a length of 6 symbols. In this case, PD2DSCH has a length of 3 symbols. SD2DSS may be disposed in a manner of enclosing both sides of PD2DSCH, or SD2DSS and PD2DSCH may be disposed alternately.

Moreover, in FIG. 18, a transition symbol may not exist according to a disposition of a subframe. In this case, it may be possible that 1 symbol is further assigned to PD2DSCH, PD2DSS, or SD2DSS. Although 4 symbols are assumed as transmitted in 4 symbols, 2 symbols may be transmitted only to reduce resource overhead. In this case, according to the embodiment shown in FIG. 18, SD2DSS is transmitted in one of the two contiguous SD2DSS symbols only and the other symbol may be utilized for the usage of PD2DSCH. Such a modification can be easily applied to the embodiments shown in FIG. 18(*a*) and FIG. 18(*c*).

FIG. 19 is a reference diagram to describe a case of disposing a synchronization signal and a synchronization channel. FIG. 19(*a*) shows that a sync signal and a sync channel are alternately disposed one by one. FIG. 19(*b*) shows that sync signals and sync channels are alternately disposed two by two. Meanwhile, since interpolation should be taken in order to perform a channel estimation for D2DSCH, it is preferable that D2DSCH is transmitted between D2DSS. In such aspect, as shown in FIG. 19(*a*), D2DSS can be particularly disposed in equal intervals within a single subframe. In doing so, PD2DSS and SD2DSS can be disposed in order. Moreover, such a principle is applicable without limitation put on the number of symbols of D2DSS.

FIG. 19(*c*) and FIG. 19(*d*) show the cases of switching a location to that of an adjacent D2DSCH in order for D2DSS to be located at both end symbols in the structure shown in FIG. 19(a) and the structure shown in FIG. 19(b), respectively. In order to decode a last D2DSCH, extrapolation is performed for the channel estimation based on D2DSS in FIG. 19(b) but interpolation is performed in FIG. 19(c) or FIG. 19(d). Hence, channel estimation performance can be improved.

When the number of D2DSS is different from that of D2DSCH, FIG. 19(e) and FIG. 19(f) show embodiments of 8 D2DSS symbols and 4 D2DSCH symbols. Likewise, FIG. 19(e) shows a case that 2 D2DSS and 1 D2DSCH simply appear alternately. FIG. 19(f) shows a case that a location is switched to that of an adjacent D2DSCH in order for D2DSS to be located at a last symbol to improve channel estimation performance.

Although a $1^{st}$ symbol and a last symbol in a subframe are assumed as not used in FIG. 19, the $1^{st}$ symbol and the last symbol can be additionally used entirely or in part. In this case, the added symbol is preferably used in a manner of being assigned to D2DSS.

Moreover, according to one embodiment of the present invention, symbols of D2DSS and D2DSCH may be respectively deleted or added. For instance, in case that symbols of D2DSS and D2DSCH are deleted, i) the deleted symbol is emptied without having anything assigned thereto, ii) a different signal (e.g., DMRS) is assigned to the deleted symbol, or iii) subsequent symbols can be moved forward one by one. For another instance, in case that symbols are added, limitation is put on the added symbols in a manner that symbols capable of playing the same role are added to right and left sides of an existing symbol. In particular, it may include a case i) of additionally inserting D2DSS in a left or right symbol of D2DSS, or a case ii) of additionally inserting D2DSCH in a left or right symbol of D2DSCH. In this case, subsequent symbols may be disposed in a manner of being shifted backward or forward one by one.

Figure 20:
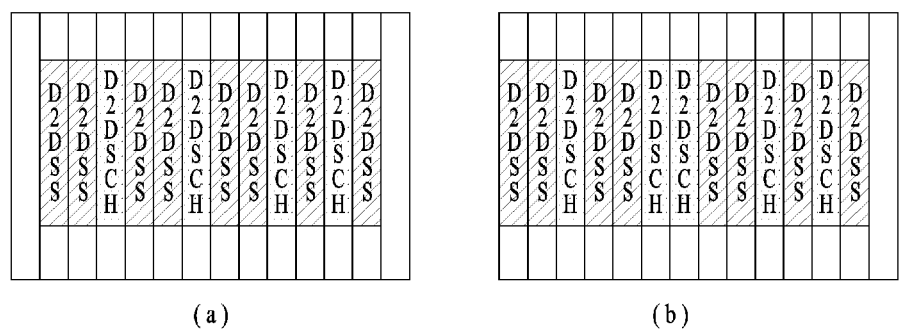
FIG. 20 shows a case that symbols are added if a synchronization signal and a synchronization channel are disposed.

FIG. 20 shows a case that symbols are added if a synchronization signal and a synchronization channel are disposed. In particular, in FIG. 20, if D2DSCH is inserted like FIG. 20(a) in a situation configured like FIG. 19(f), it may result in FIG. 20(b).

In doing so, D2DSS may include PD2DSS (Primary D2DSS) or SD2DSS (Secondary D2DSS). And, in contiguously D2DSS located symbols, i) only PD2DSS appears, ii) PD2DSS and SD2DSS appear repeatedly, iii) SD2DSS appear specific number of times (e.g., Y times) after PD2DSS have appeared prescribed number of times (e.g., X times), or iv) PD2DSS and SD2DSS can appear contiguously plural times (e.g., twice). Particularly, in the case of iv), a cyclic prefix (CP) should not exist between the same PD2DSS/SD2DSS appearing contiguously (e.g., twice). Instead, in order to match a symbol length complementarily, an appropriate cyclic prefix (CP) length is added to a front side, a rear side, or both of the front and rear sides of a contiguous symbol. In particular, it may result in a form: i) [CP1, CP2, sym1, sym2]; or ii) [CP1, sym1, sym2, CP2]. Moreover, it may result in a form iii) of matching a timing to an end portion of a symbol and deleting a CP part in front of sym1. In particular, it may result in [empty, sym1, sym2] (where, 'CP' means a cyclic prefix, 'sym' means a symbol, and 'empty' means an empty symbol).

Figure 21:
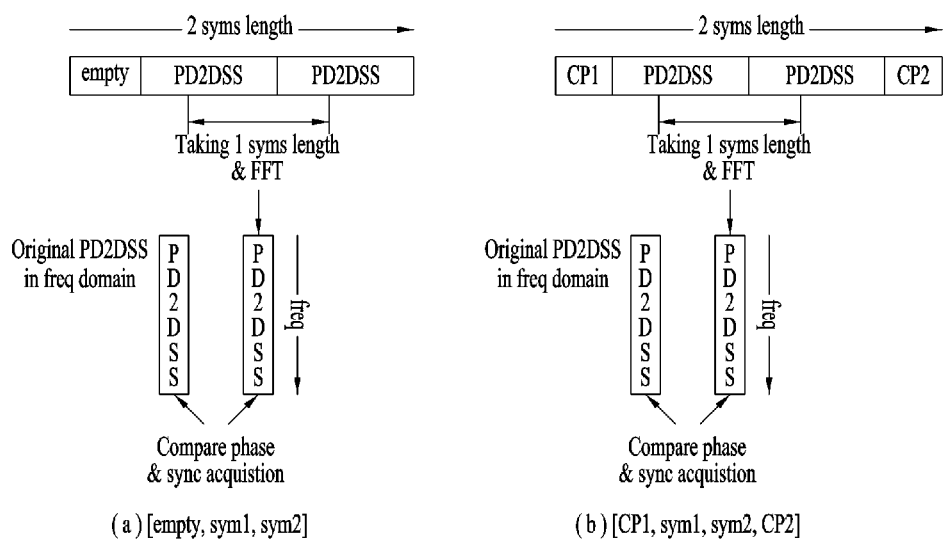
FIG. 21 is a reference diagram to describe a synchronization signal monitoring method proposed by the present invention.

FIG. 21 is a diagram to describe a sync signal monitoring method proposed by the present invention by taking forms of [empty, sym1, sym2] and [CP1, sym1, sym2, CP2] as examples. In this case, if an FFT operation is taken by reading 1-symbol length at a random location on 2 contiguous symbols, since a phase shift in a frequency domain appears as a time difference of symbol, a monitoring can be performed in a predetermined time interval only without monitoring sync signals continuously.

Moreover, a start/end location of D2DSCH/D2DSS symbol in a subframe of a symbol does not have a significant meaning. A sync reference signal/channel (RS/CH) transmission may start from a $1^{st}$ symbol of a subframe and end at a last symbol of the subframe. As obvious extension of the present invention, inversion of time-based correlation of symbols is included. If the time-based correlation of symbols is inverted from that shown in FIG. 21, synchronization of D2D system and sync channel transceiving performance are not affected at all.

D2DSCH may be omitted occasionally. As a representative example, when a user equipment operates on in-NW, information of D2DSCH can be delivered through RRC signaling instead of D2DSCH. This is particularly effective in case of performing a device discovery only. In this case, D2DSS can be additionally transmitted in the D2DSCH omitted symbol.

Moreover, in case that a transmitting (Tx) user equipment (particularly) transmits D2DSS of different types to a multitude of receiving user equipments, periodicity of each of the D2DSS may be different. For instance, the D2DSS transmitted to an in-NW user equipment and the D2DSS transmitted to an out-NW user equipment may differ from each other in periodicity and a presence or non-presence of D2DSCH may be changed. Hence, it is necessary to regulate an operation in case that D2DSS subframes of the two types for different usages overlap each other.

Figure 22:
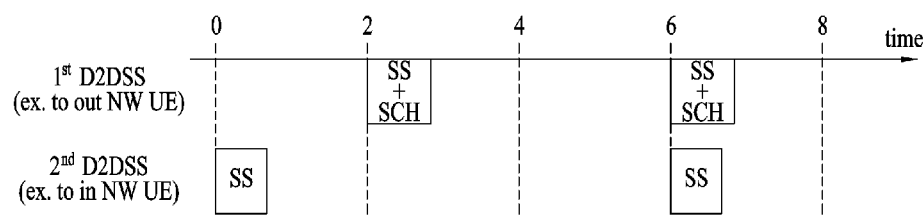
FIG. 22 is a reference diagram to describe a case that D2DSS subframes of two types for different usages overlap each other.

FIG. 22 is a reference diagram to describe a case that D2DSS subframes of two types for different usages overlap each other. In FIG. 22, while a $1^{st}$ D2DSS is always accompanied by D2DSCH and is transmitted in $1^{st}$ periodicity (periodicity=4), if a $2^{nd}$ D2DSS is transmitted in $2^{nd}$ periodicity (periodicity=6) without being accompanied by D2DSCH, it may cause a problem that a transmission of the $1^{st}$ periodicity and a transmission of the $2^{nd}$ periodicity overlap each other. In doing so, the $1^{st}$ D2DSS may include a D2DSS for a communication between devices, and more particularly, for a communication with a UE located in a place incapable of receiving RRC due to an existence out of a coverage of a network, while the $2^{nd}$ D2DSS may include a D2DSS for a device discovery within a network. If such an overlapping occurs, a UE can selectively transmit D2DSS of one type only by applying one of the following rules 1) to 3).

Rule 1) $1^{st}$ D2DSS accompanied by D2DSCH is selected. Since the D2DSCH carries significant information, if a transmission is skipped once only, it may cause a problem. Although a UE expects a reception of $2^{nd}$ D2DSS, if the UE recognizes that D2DSS of a different type is received at an overlapping timing point, the UE can operate by assuming that the $2^{nd}$ D2DSS is not transmitted at the corresponding timing point.

Rule 2) D2DSS having longer periodicity is selected. Although a transmission opportunity is lost, D2DSS having short periodicity can have another transmission opportunity with no problems. Yet, a loss of one opportunity by D2DSS having long periodicity is connected to considerable performance degradation. Particularly, in case that a corresponding UE does not need to transmit a D2D signal (e.g., a communication signal with a UE located out of coverage) corresponding to a D2DSS with shorter periodicity, it is preferable to select the D2DSS with the longer periodicity in aspect of prevention of unnecessary D2DSS transmission.

Rule 3) An eNB designates to select which D2DSS in advance. Particularly, although the eNB indicates a D2DSS transmission with different periodicity through a dedicated signal targeting a specific UE only despite configuring a D2DSS transmission with specific periodicity through such a broadcast signal as SIB targeting a multitude of unspecific UEs, it can be construed as the eNB designates D2DSS transmission periodicity indicated through the dedicated signal.

In the above-described operation, two D2DSS having possibility of collision may be transmitted from the same UEs having the same sequence. If so, the $1^{st}$ D2DSS and the $2^{nd}$ D2DSS differ from each other in the number or location of symbols used for a transmission of D2DSS by the same D2DSS according to transmission periodicity only but the same operation can be performed.

Hence, although the same UE participates in two services for different usages such as discovery and communication, the corresponding UE transceives the same D2DSS differently in accordance with a situation, whereby the discovery and communication services can be efficiently provided.

Meanwhile, a cluster head (CH) detects a sync signal from an eNB and then transmits D2DSS on center N resource block (RB (e.g., center 6 RB) on a UL bandwidth, and at least one relay can deliver a sync signal using a resource region of center resource block (i.e., 6 RB) distinguished in frequency domain as well as in time domain.

Figure 23:
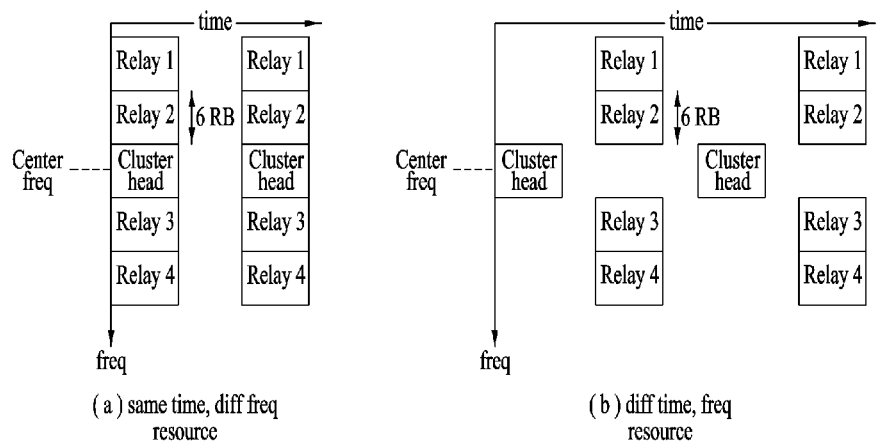
FIG. 23 is a reference diagram to describe a case of transmitting D2DSS using a center resource block according to the present invention.

FIG. 23 is a reference diagram to describe a case of transmitting D2DSS using center resource block according to the present invention. FIG. 23(a) shows a case of delivering relay D2DSS using different frequency resources in the same time domain (e.g., same subframe). FIG. 23(b) shows a case of transmitting relay D2DSS by differentiating both a time domain and a frequency domain.

Moreover, relays can transmit D2DSS by SFN (single frequency network) scheme using a resource configured with N resource blocks of the same time and frequency. In doing so, since several signals overlap each other, receiving D2D user equipments have high probability of sync detection.

Figure 24:
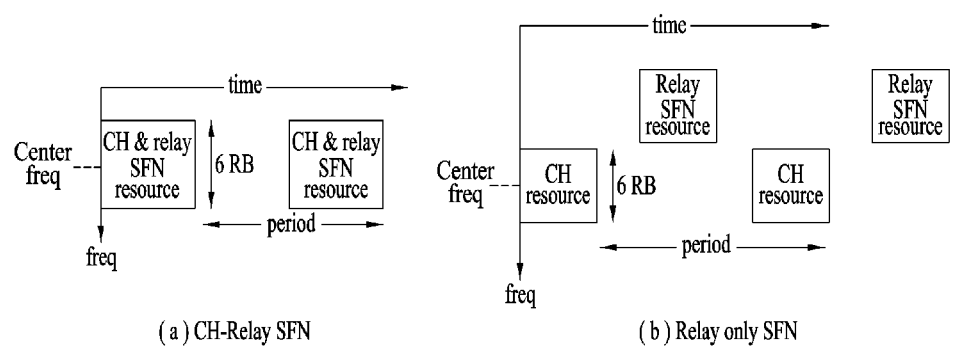
FIG. 24 is a reference diagram to describe two kinds of examples for describing SFN according to the present invention.

FIG. 24 is a reference diagram to describe two kinds of examples for describing SFN according to the present invention. FIG. 24(a) shows a method for a cluster head and relays to configure SFN together by transmitting D2DSS on the same resource of the cluster head. In viewpoint of a receiving user equipment, a signal strength of the D2DSS may be strongest. Yet, an arrival timing point of the D2DSS may be shaken due to a propagation delay between the cluster head and the relay. On the other hand, FIG. 24(b) shows a method for relay D2DSSs to configure SFN on a resource different from that of a cluster head. In viewpoint of a receiving user equipment, although a reception strength is weaker than that shown in FIG. 25(a), it is advantageous in that D2DSS arrives at the relatively same timing.

Meanwhile, in a current communication system, a user equipment generally has 1 transmitting antenna. Yet, a prescribed user equipment uses at least two transmitting antennas and such a rate of using the transmitting antennas will be increasingly extended. Hence, when a user equipment having a plurality of antennas transmits a D2D sync reference signal (RS), it is possible to multiply a precoding. As mentioned in the foregoing description, in order to achieve a predetermined combining gain irrespective of channel fluctuation, it is necessary to average a channel by multiplying each of a plurality of reference signals by a different precoding.

Figure 25:
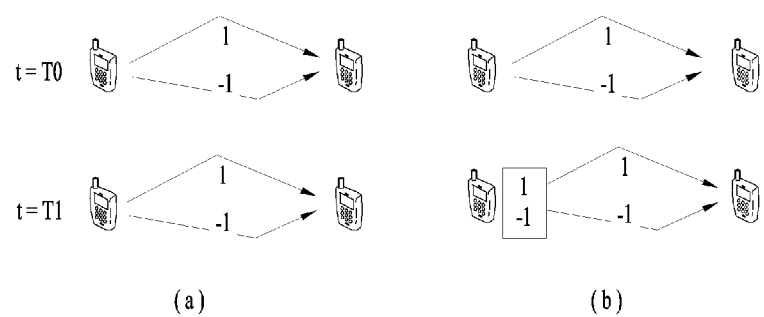
FIG. 25 is a reference diagram to describe a case that a phase shift is necessary.

FIG. 25 is a reference diagram to describe a case that a phase shift is necessary. In FIG. 25, assume a case of transmitting the same signal twice each. And, 2 transmitting (Tx) antennas and 1 receiving (Rx) antenna are assumed. In the case of FIG. 25(a), since a signal at 't=T1' and a signal at 't=T2' are transmitted in the same phase and channels of the respective transmitting antennas are in direct opposite situation (channel of a transmitting antenna 1 is 1, channel of a transmitting antenna 2 is −1), signals from the two transmitting antennas cancel out each other to result in a signal of 0 in a receiving end that performs a simple combining without knowing a channel status. Hence, in case of FIG. 25(a), although reference signals are repeatedly transmitted, a gain is not obtained. On the other hand, in case of FIG. 25(b), when a combining is performed at t=T0, the signals cancel out each other. Yet, since the signals are transmitted by having a precoding of [1-1] applied thereto at t=T1, it is able to obtain a combining gain '2'. The signal transmitted from the transmitting antenna 1 at t=T1 passes through a channel of '1' without a phase change. There occurs an effect that the signal transmitted from the transmitting antenna 2 passes through a channel of '−1' first owing to the precoding. As this signal passes the channel corresponding to '−1' again, the signal of '1' finally arrives at the receiving end. Hence, the receiving end receives the signal of '2' if the signals of the two transmitting antennas are simply added to each other.

Therefore, if a precoding is differently applied to each symbol or each subframe, although a D2D user equipment has any channel state, it is able to guarantee a reference signal detection of a predetermined level with high probability. In particular, a diversity gain can be obtained. If a sync reference signal (sync RS) is repeated in a same subframe, since a channel change of each symbol will be insignificant, it is able to assume that every transmission symbol has the same channel. Hence, when a precoding is differently applied to each symbol, it is preferable that a distance between precoding vectors is designed to increase as far as possible. So to speak, a precoding is applied in a manner that each reference signal has a phase difference as big as possible.

For instance, when a count of repetitive transmissions of reference signals is set to N on the assumption of a real number channel, if a phase shift amounting to $2\pi/N$ is considered for each symbol, it provides a biggest diversity gain. In doing so, although phases can be shifted sequentially in order of symbols, they may be shifted arbitrarily. Meanwhile, in case that sync reference signal is transmitted across several subframe, it is able to assume that a channel is independent for each reference signal symbol. In particular, in this case, it is able to obtain a diversity gain without multiplying by a precoding, it is preferable that a multiplying by a precoding is performed for the case of a slow channel change like a slow fading. Alternatively, it may be able to obtain a diversity gain by performing a precoding multiplication on each antenna port.

Figure 26:
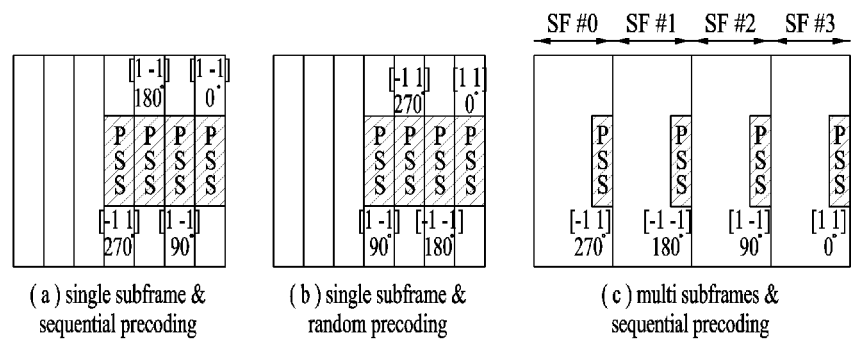
FIG. 26 is a reference diagram to describe a case of performing a precoding in case of n=4 according to the present invention.

FIG. 26 is a reference diagram to describe a case of performing a precoding in case of n=4 according to the present invention. For clarity of the description, type 2 reference signal (type2 RS) is omitted from FIG. 26. Yet, since the a type 2 reference signal (type2 RS) can be assigned to the rest of symbols remaining after assigning type 1 reference signal (type1 RS) in the same manner of the type 1 reference signal (type1 RS) or a frame boundary and a CP length detection of the type 2 reference signal (type2 RS) can be performed with the type 1 reference signal (type1 RS), the type 2 reference signal (type2 RS) can be omitted.

In the following description, a case of further extending to apply a precoding according to the present invention is explained.

Figure 27:
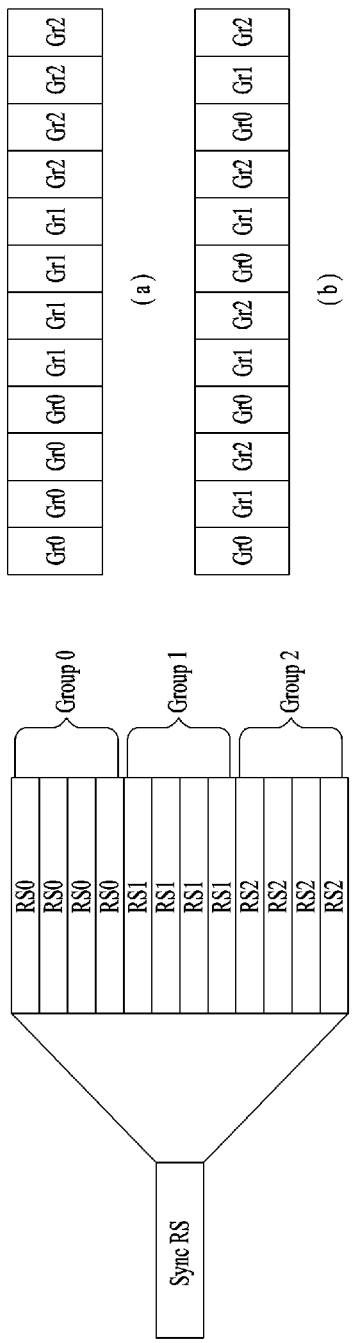
FIG. 27 is a reference diagram to describe an operation of obtaining a frequency synch if a phase is shifted.

Since phase shifted reference signals differ from each other in effective channel, as shown in FIG. 27, it is impossible to obtain frequency sync from a reference signal differing in phase. Hence, since reference signals having the same phase should be compared with each other, type 1 reference signals (type1 RS) and type 2 reference signals (type2 RS) can be sorted by a reference signal group having the same phase. And, it is necessary to consider a physical mapping capable of obtaining time sync and frequency sync from the reference signal group most appropriately.

Generally, assuming that sync reference signals (RS) have total N types of reference signals and are divided into k groups, it is able to assume that each of the groups has a phase change of the same type. In particular, each group having the same phase is configured as a set in size of N/k.

For instance, FIG. 27 shows assignment patterns of two types if N=12 and k=3. Each reference signal occupies 1 symbol. FIG. 27(a) shows a structure of representing all symbols of each group and assigning subsequent groups in sequence. For a blind detection of a receiving (Rx) user equipment, a boundary between groups may be necessary. Hence, as a method of setting an inter-group boundary, it is able to consider a method of changing a reference signal progression on a last symbol of a group specifically or a configuration in which a boundary symbol and the rest of symbols include SSS and PSS, respectively. in this case, a boundary of each group is unnecessary but an end for whole sync reference signal (sync RS) needs to be distinguished separately. Hence, the boundary setting method described with reference to FIG. 27(a) may be applied or a special delimiter may be attached to an end of a reference signal. Meanwhile, in a process for a reference signal to obtain frequency sync, reference signals within the same precoding group are compared to each other only. In doing so, if symbols in the group are close to each other, a frequency sync on a large scale can be captured. If symbols are distant from each other, a frequency sync on a small scale can be captured. Hence, regarding the frequency obtaining shown in FIG. 27, since FIG. 27(a) shows that continuous symbols belong to the same group, it is able to obtain a frequency error on a large scale only. Since FIG. 27(b) shows that symbols spaced apart from each other in predetermined distance belong to the same group, it is able to obtain a frequency error on a small (or intermediate) scale only. Hence, by disposing group symbols in various ways, it is able to obtain frequency errors in various ranges.

FIG. 28 is a reference diagram to describe various embodiments of disposing groups on various symbols according to the present invention.

FIG. 28(a) shows that groups are alternately disposed by being paired with 2 each. In aspect of frequency sync, a frequency sync on a large scale is obtained from a part paired with same group symbols and a frequency sync on a small scale can be obtained using same group symbols spaced far away from each other. FIG. 28(b) shows a structure for obtaining a frequency sync in a manner of concentrating on a time synchronization using a space diversity by alternately arranging groups in front symbols of a reference signal, transmitting a same group reference signal in adjacent symbols (i.e., contiguously located symbols) among rear symbols, and then comparing them. In this case, in order to indicate a boundary between the front part and the rear part, the method mentioned in the foregoing description with reference to FIG. 27 can be used. FIG. 28(c) shows a modification of the arrangement described with reference to FIG. 28(b). In particular, it is able to select which part will be considered important between the time sync and the frequency sync by adjusting the number of transmission symbols of the front part in which the groups are alternately arranged. FIG. 28(d) shows a method of obtaining a time sync and a frequency error on a large scale by disposing symbols of a same group on a front part and obtaining a frequency error on a small scale by disposing symbols of a same group on a rear part in a manner of leaving a predetermined interval between the symbols. As mentioned in the foregoing description, it is able to configure to indicate a boundary between the front part and the rear part and an end of a whole reference signal. In particular, regarding FIG. 28(d), as a group (e.g., reference signals on $1^{st}$ and $2^{nd}$ symbols in FIG. 28(d)) occupying adjacent symbols in a front part among symbols belonging to the same group and a group (e.g., reference signals on $7^{th}$ and $10^{th}$ symbols in FIG. 28(d)) appearing from a rear side by being separated are spaced apart too much far from each other, since the value for practical use of the groups may be depreciated for the usage of obtaining a frequency sync using both, those groups can operate not to have the same precoding applied thereto by being classified into separate groups in the first place. In particular, although symbols belong to the same group in FIG. 28(d), they can operate not to have the same precoding applied thereto by sorting 2 symbols located on a front side and 2 symbols located on a rear side into separate subgroups.

According to the present invention, the above-mentioned 'same group' should be construed as meaning a reference signal set having a same precoding or a same antenna port but does not mean a same reference signal. For instance, PSS/SSS corresponding to different progressions may belong to a same group. And, PSS generated from different seeds may belong to a same group.

If different progressions are combined into a same group, information such as D2D ID, unicast/broadcast/groupcast or the like can be delivered through a blind detection of a D2D receiving (Rx) user equipment. In particular, if a group is configured by appropriately combining same progressions and different progressions, an appropriate combining gain is advantageously obtained as well as information delivery through a sync reference signal (sync RS) is advantageously performed. Moreover, through an inter-group precoding, it is able to adjust diversity.

Figure 29:
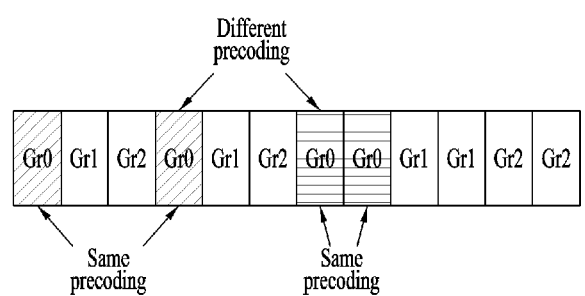
FIG. 29 is a reference diagram to describe a case of applying a precoding differently despite the same group.

Moreover, different precodings can be applied to a same group. FIG. 29 is a reference diagram to describe a case of applying a precoding differently despite the same group. For instance, in the case shown in FIG. 27(b), a time sync and a small-scale frequency sync are obtained from group symbols alternately assigned to a front side, while a large-scale frequency sync can be obtained from group symbols repeated on a rear side. In doing so, since an operation of comparing a front group and a rear group to each other is not necessary, as shown in FIG. 29, precoding can be differently applied to a same group.

Figure 30:
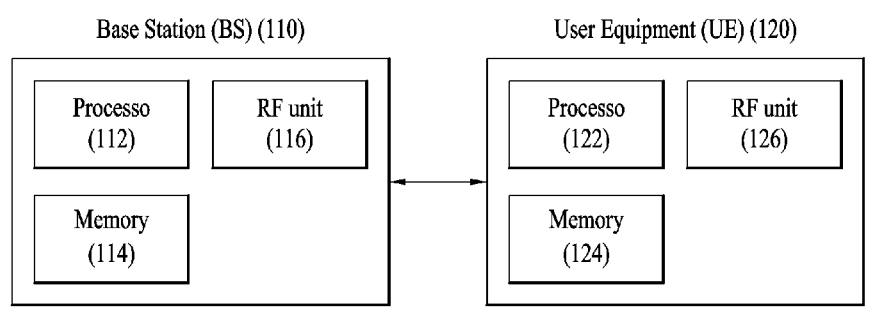
FIG. 30 is a reference diagram for a base station and a user equipment applicable to an embodiment of the present invention.

FIG. 30 is a reference diagram for a base station and a user equipment applicable to an embodiment of the present invention. If a relay is included in a wireless communication system, a communication in backhaul link is performed between a base station and a relay. And, a communication in access link is performed between a relay and a user equipment. Hence, the base station or user equipment shown in the drawing may be substituted with a relay in some cases.

Referring to FIG. 30, a wireless communication system includes a base station (BS) 110 and a user equipment (UE)

120. The baser station 110 includes a processor 112, a memory 114, and a Radio Frequency (RF) unit 116. The processor 112 may be configured to perform the proposed procedures and/or methods according to the present invention. The memory 114 is connected to the processor 112 and stores various types of informations related to operations of the processor 112. The RF unit 116 is connected to the processor 112 and transmits and/or receives radio signals. The user equipment 120 includes a processor 122, a memory 124, and an RF unit 126. The processor 122 may be configured to perform the proposed procedures and/or methods according to the present invention. The memory 124 is connected to the processor 122 and stores various information related to operations of the processor 122. The RF unit 126 is connected to the processor 122 and transmits and/or receives radio signals. The baser station 110 and/or the user equipment 120 may have a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transmitting a synchronization signal for a D2D (Device-to-Device) communication in a wireless communication system and apparatus therefor are described mainly with reference to examples applied to 3GPP LTE system, as mentioned in the foregoing description, the present invention is applicable to various kinds of wireless communication systems as well as to the 3GPP LTE system.

What is claimed is:

1. A method for transmitting a D2D (Device-to-Device) synchronization signal (D2DSS) for a D2D communication by a user equipment in a wireless communication system, the method comprising
transmitting the synchronization signal for the D2D communication,
wherein a first root index associated with the synchronization signal for the D2D communication is set different from a second root index associated with a synchronization signal for a cellular communication and
wherein a number of first root indexes is smaller than a number of second root indexes,
wherein the synchronization signal for the D2D communication comprises a first synchronization signal and a second synchronization signal,
wherein the first synchronization signal and the second synchronization signal are configured to differ from each other in periodicity, and
wherein if a reception timing point of the first synchronization signal is equal to a reception timing point of the second synchronization signal, a long-periodicity synchronization signal from the first synchronization signal and the second synchronization signal is monitored.

2. The method of claim 1, wherein based on a sequence for the synchronization signal for the cellular communication, a sequence for the synchronization signal for the D2D communication is generated through at least one selected from a group consisting of a change of a sequence length, a change of a sequence identity (ID), a change of a cyclic shift, a change of a repetition count, a change of a transmission location, and a change of transmission periodicity.

3. The method of claim 1, wherein each of the first synchronization signal and the second synchronization signal is configured to be located on contiguous symbols.

4. The method of claim 1, wherein the first synchronization signal and the second synchronization signal are configured to be located alternately.

5. The method of claim 1, wherein the first synchronization signal and the second synchronization signal are assigned to a prescribed number of contiguous symbols in a single subframe.

6. The method of claim 1, wherein the synchronization signal for the D2D communication comprises a synchronization channel for the D2D communication (D2DSCH), and
wherein the D2D synchronization channel is configured to be located between the first synchronization signal and the second synchronization signal.

7. The method of claim 6, wherein a symbol corresponding to one selected from the group consisting of the first synchronization signal, the second synchronization signal and the D2D synchronization channel is configured to have a demodulation reference signal (DMRS) reassigned.

8. The method of claim 1, wherein the second synchronization signal is configured to be used for a frequency error detection.

9. The method of claim 1, wherein the synchronization signal for the D2D communication is assigned to a multitude of contiguous symbols and monitored by a receiving end for one symbol duration at a specific location among a plurality of the contiguous symbols.

10. The method of claim 1, wherein the synchronization signal for the D2D communication is configured to have a frequency domain different from a frequency domain of a D2D synchronization signal of a cluster head on a same time domain.

11. The method of claim 1, wherein the synchronization signal for the D2D communication comprises a multitude of groups,
   wherein each of the groups comprises a multitude of symbols having a same phase change, and
   wherein physical mapping locations of a plurality of the groups are determined according to frequency obtaining scale.

12. A user equipment for transmitting a D2D (Device-to-Device) synchronization signal (D2DSS) for a D2D communication in a wireless communication system, the user equipment comprising:
   a radio frequency unit; and
   a processor configured to transmit the synchronization signal for the D2D communication,
   wherein a first root index associated with the synchronization signal for the D2D communication is set different from a second root index associated with a synchronization signal for a cellular communication and
   wherein a number of first root indexes is smaller than a number of second root indexes, and
   wherein the synchronization signal for the D2D communication comprises a first synchronization signal and a second synchronization signal,
   wherein the first synchronization signal and the second synchronization signal are configured to differ from each other in periodicity, and
   wherein if a reception timing point of the first synchronization signal is equal to a reception timing point of the second synchronization signal, a long-periodicity synchronization signal from the first synchronization signal and the second synchronization signal is monitored.

* * * * *

UNITED STATES PATENT AND TRADEMARK OFFICE
CERTIFICATE OF CORRECTION

PATENT NO. : 9,924,478 B2  
APPLICATION NO. : 14/912850  
DATED : March 20, 2018  
INVENTOR(S) : Daewon Seo et al.

Page 1 of 1

It is certified that error appears in the above-identified patent and that said Letters Patent is hereby corrected as shown below:

On the Title Page

Item (60), change:
"(60) Provisional application No. 61/872,756, filed on Sep. 1, 2015"
To:
-- (60) Provisional application No. 61/872,756, filed on Sep. 1, 2013 --

And change:
"provisional application No. 61/972,939, filed on Mar. 30, 2014."
To:
-- provisional application No. 61/972,393, filed on Mar. 30, 2014. --

Signed and Sealed this
Twenty-sixth Day of June, 2018

Andrei Iancu
*Director of the United States Patent and Trademark Office*